United States Patent
Fukutsuka et al.

(10) Patent No.: US 12,179,110 B2
(45) Date of Patent: Dec. 31, 2024

(54) NON-TRANSITORY COMPUTER-READABLE MEDIUM STORING GAME PROGRAM, AND GAME SYSTEM

(71) Applicant: COLOPL, Inc., Tokyo (JP)

(72) Inventors: Tsubasa Fukutsuka, Tokyo (JP); Chikara Kitamura, Tokyo (JP)

(73) Assignee: COLOPL, Inc., Tokyo (JP)

( * ) Notice: Subject to any disclaimer, the term of this patent is extended or adjusted under 35 U.S.C. 154(b) by 167 days.

(21) Appl. No.: 17/808,582

(22) Filed: Jun. 24, 2022

(65) Prior Publication Data

US 2022/0314121 A1 Oct. 6, 2022

Related U.S. Application Data

(63) Continuation of application No. PCT/JP2020/046874, filed on Dec. 16, 2020.

(30) Foreign Application Priority Data

Dec. 27, 2019 (JP) ................. 2019-239759

(51) Int. Cl.
*A63F 13/573* (2014.01)
*A63F 13/812* (2014.01)

(52) U.S. Cl.
CPC .......... *A63F 13/573* (2014.09); *A63F 13/812* (2014.09); *A63F 2300/646* (2013.01)

(58) Field of Classification Search
CPC .......... A63F 13/22; A63F 13/25; A63F 13/40; A63F 13/42; A63F 13/426; A63F 13/44; A63F 13/45; A63F 13/46; A63F 13/50; A63F 13/52; A63F 13/525; A63F 13/537; A63F 13/5378; A63F 13/55; A63F 13/56;
(Continued)

(56) References Cited

U.S. PATENT DOCUMENTS

2007/0024597 A1* 2/2007 Matsuoka ........... G06F 3/04883
345/173
2012/0274587 A1 11/2012 Matsuoka
(Continued)

FOREIGN PATENT DOCUMENTS

JP 2007-34634 A 2/2007
JP 2008-79989 A 4/2008
(Continued)

OTHER PUBLICATIONS

International Search Report issued Mar. 16, 2021 in PCT/JP2020/046874, filed on Dec. 16, 2020, 2 pages.
(Continued)

*Primary Examiner* — Omkar A Deodhar
(74) *Attorney, Agent, or Firm* — Oblon, McClelland, Maier & Neustadt, L.L.P.

(57) ABSTRACT

A non-transitory computer-readable medium storing a game program causing a processor of a terminal device used by a user to execute: displaying a first object including an indication relating to a shot of a ball; receiving an input operation of the user; displaying a second object that moves in accordance with the input operation; and executing the shot in accordance with the indication determined by a positional relationship between the first object and the second object that has moved in accordance with the input operation.

12 Claims, 15 Drawing Sheets

(58) Field of Classification Search
CPC ...... A63F 13/57; A63F 13/573; A63F 13/812; A63F 13/837
See application file for complete search history.

(56) References Cited

U.S. PATENT DOCUMENTS

| | | | | |
|---|---|---|---|---|
| 2012/0274857 | A1* | 11/2012 | Maxwell | G06F 3/14 348/E9.037 |
| 2017/0216729 | A1* | 8/2017 | Onishi | A63F 13/812 |

FOREIGN PATENT DOCUMENTS

| | | |
|---|---|---|
| JP | 2012-125335 A | 7/2012 |
| JP | 2016-43067 A | 4/2016 |
| JP | 2016-83047 A | 5/2016 |
| JP | 2018-161435 A | 10/2018 |
| JP | 2018-161436 A | 10/2018 |
| JP | 6479874 B2 | 3/2019 |
| KR | 10-2016-0109803 A | 9/2016 |

OTHER PUBLICATIONS

English translation of International Preliminary Report on Patentability and Written Opinion issued Jul. 7, 2022 in PCT/JP2020/046874, 6 pages.

Extended European Search Report issued Dec. 14, 2023 in European Patent Application No. 20906438.5, 10 pages.

Korean Office Action issued May 13, 2024 in Korean Patent Application No. 10-2022-7021796, (with unedited, machine-generated English translation), 12 pages.

* cited by examiner

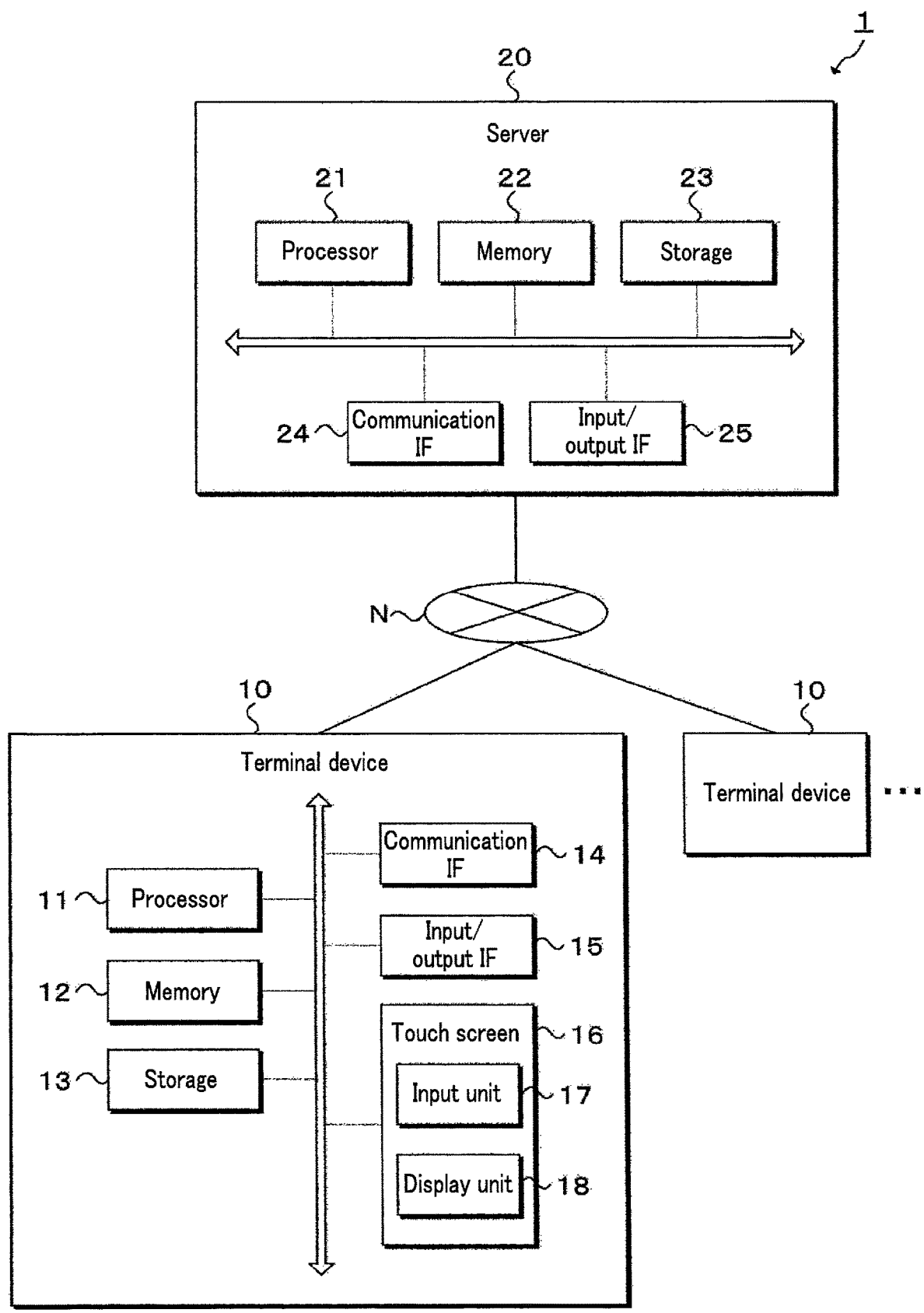
F I G. 1

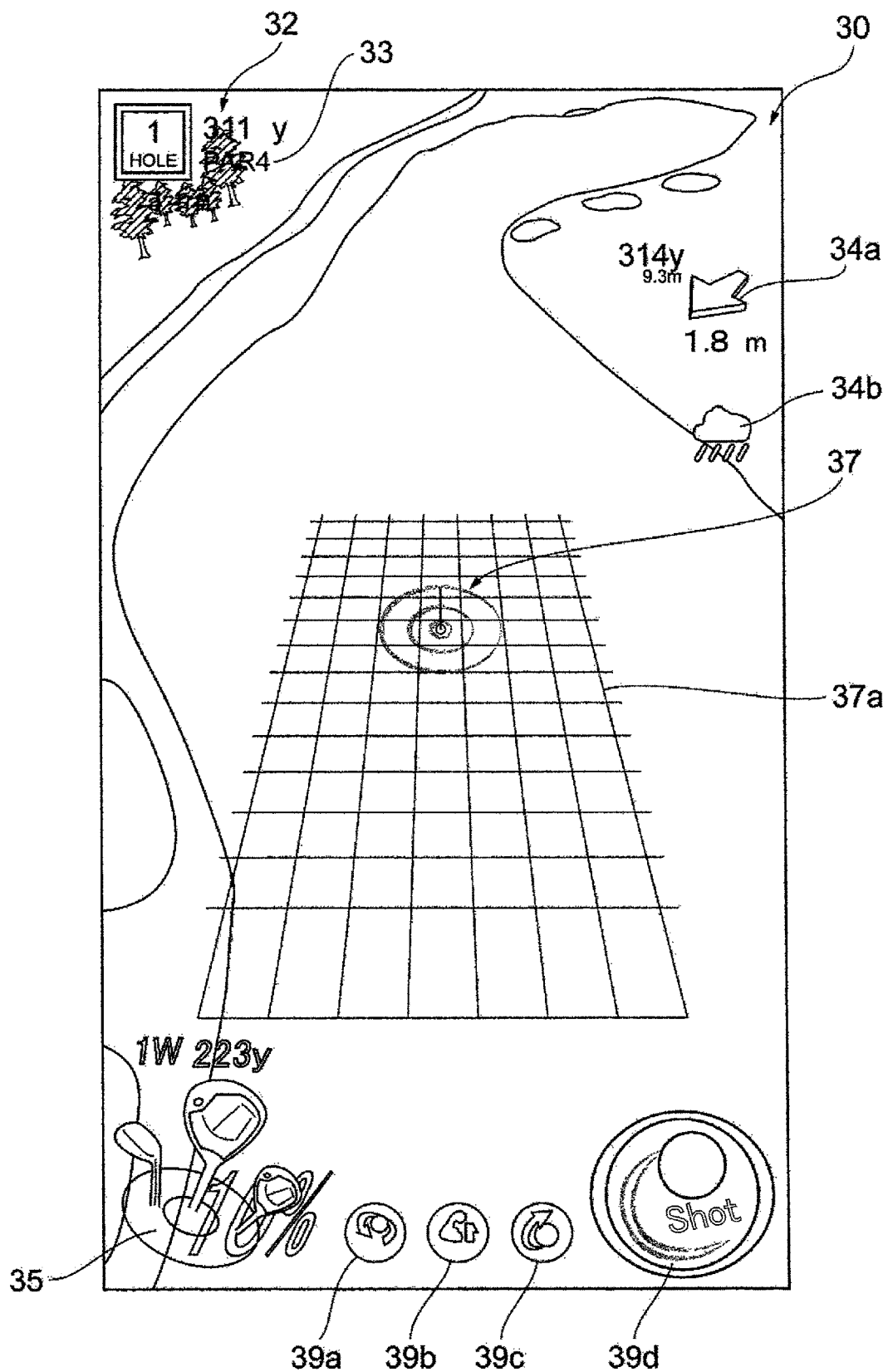
F I G. 5

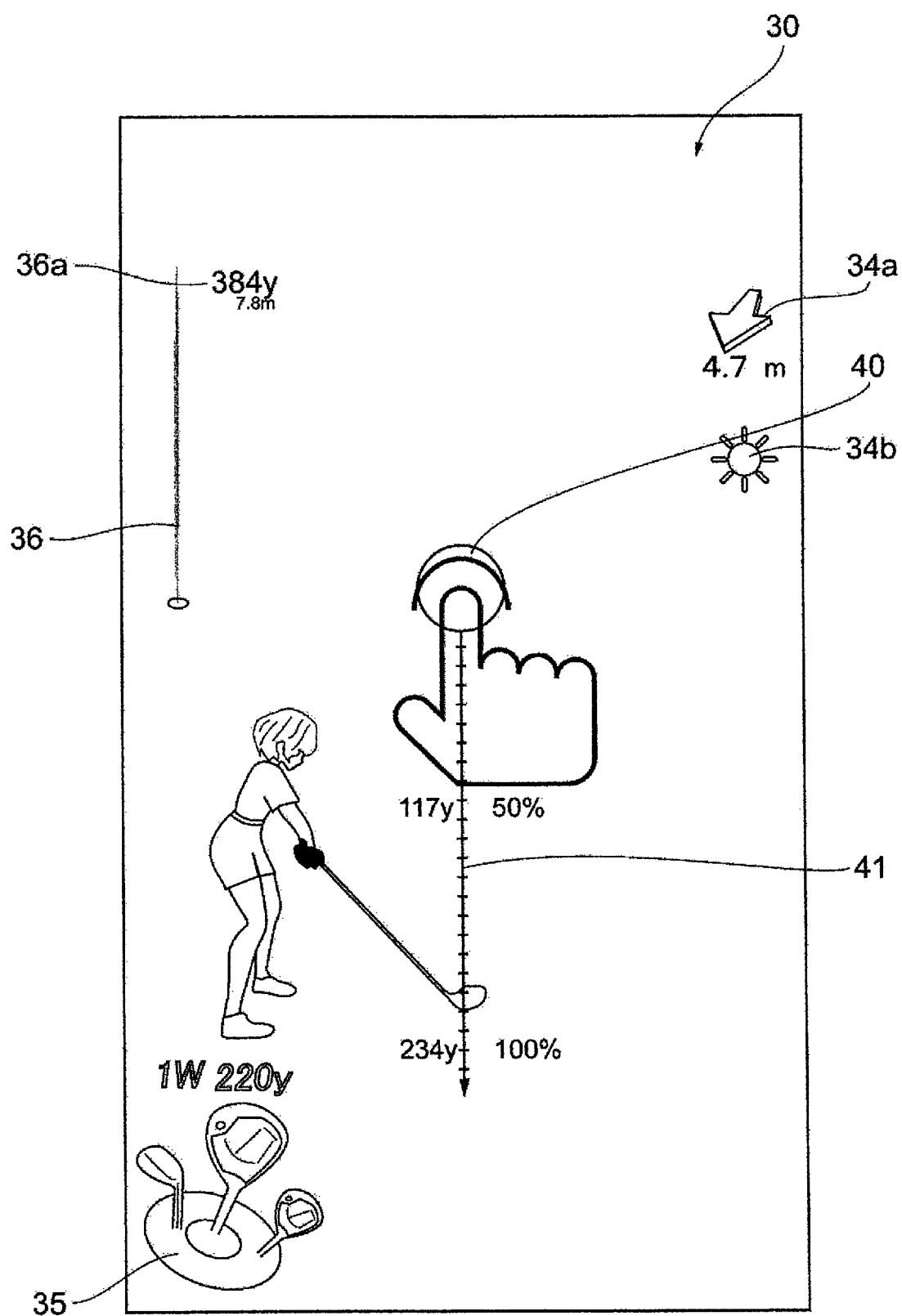
F I G. 7

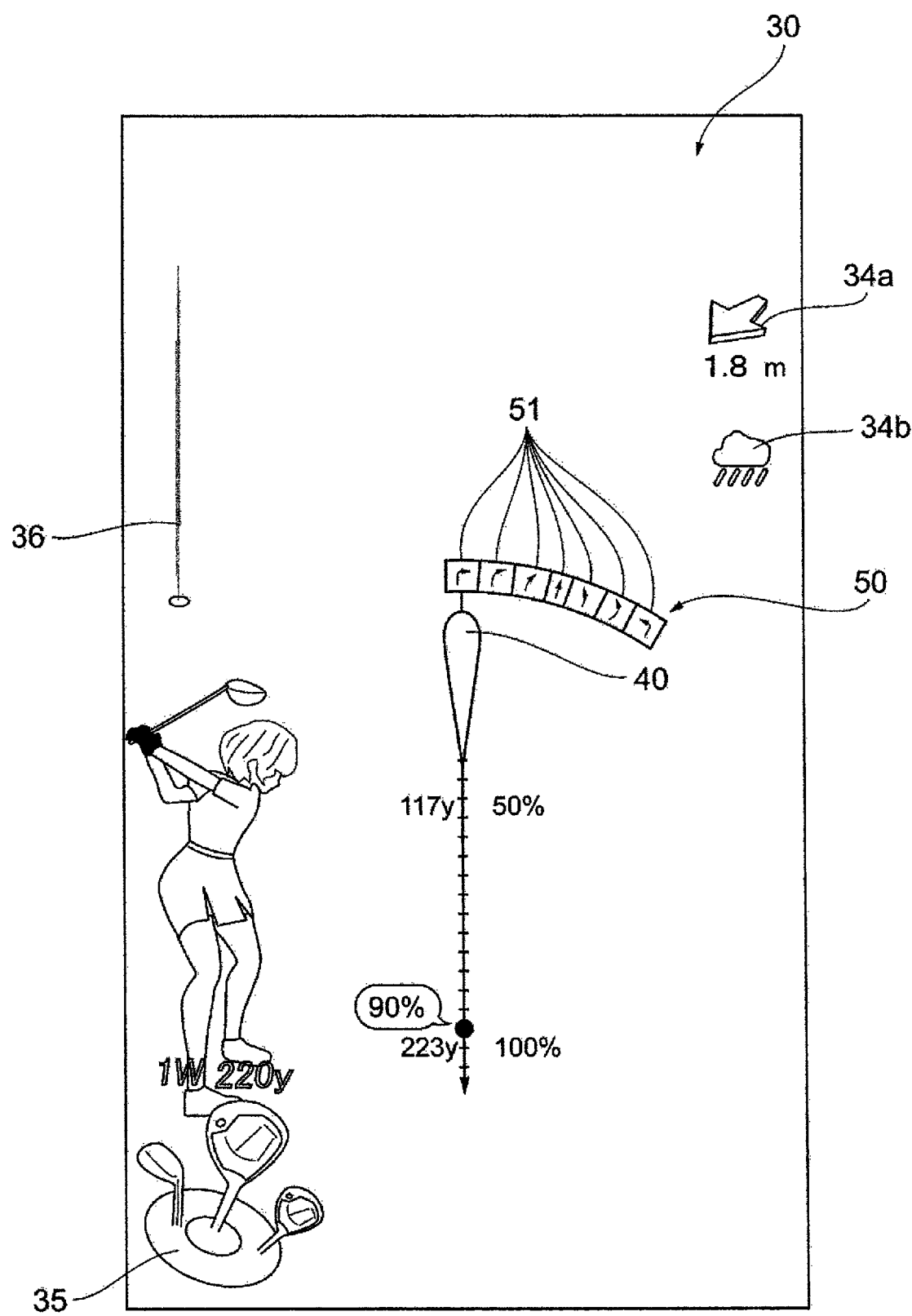
F I G. 10

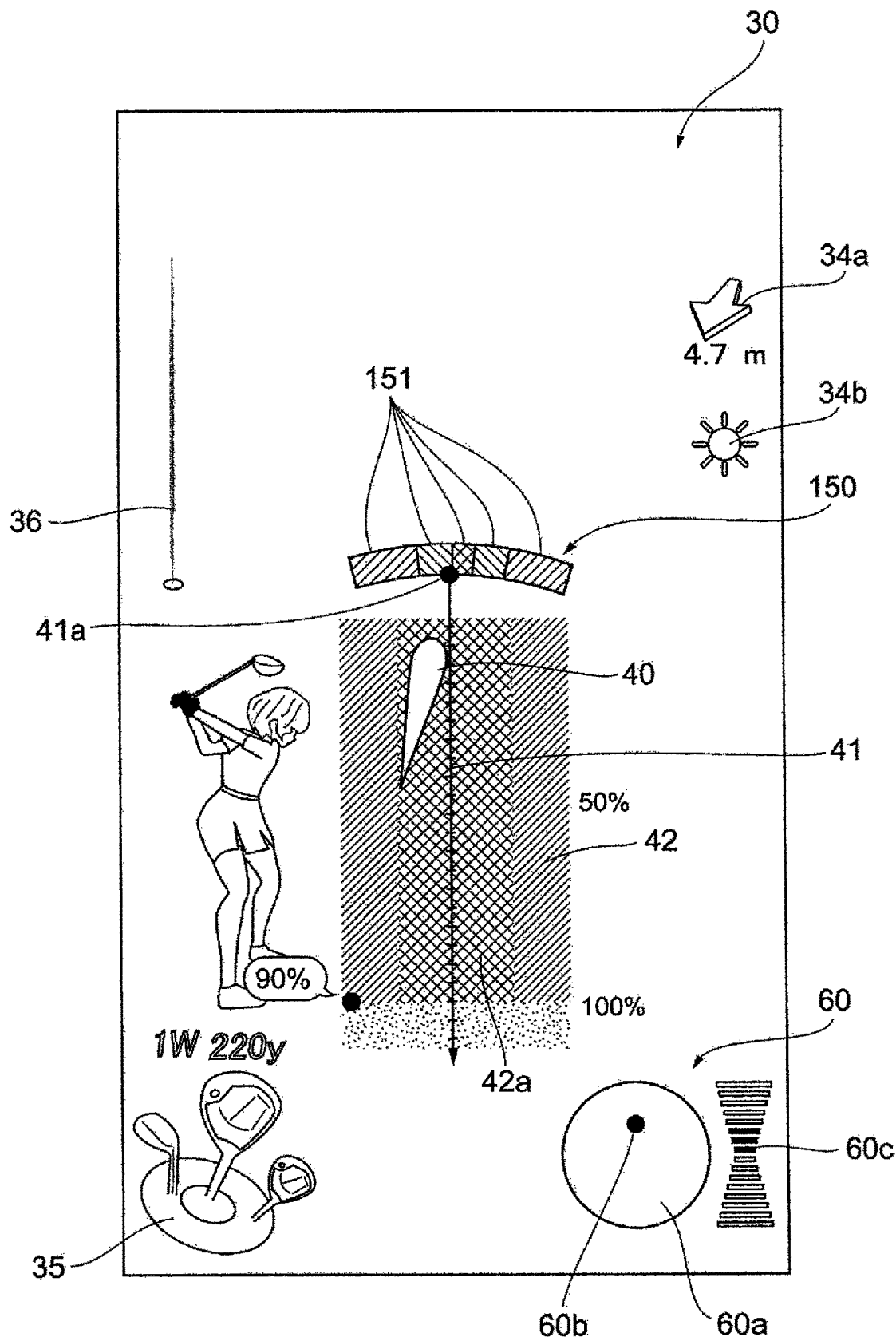
F I G. 14

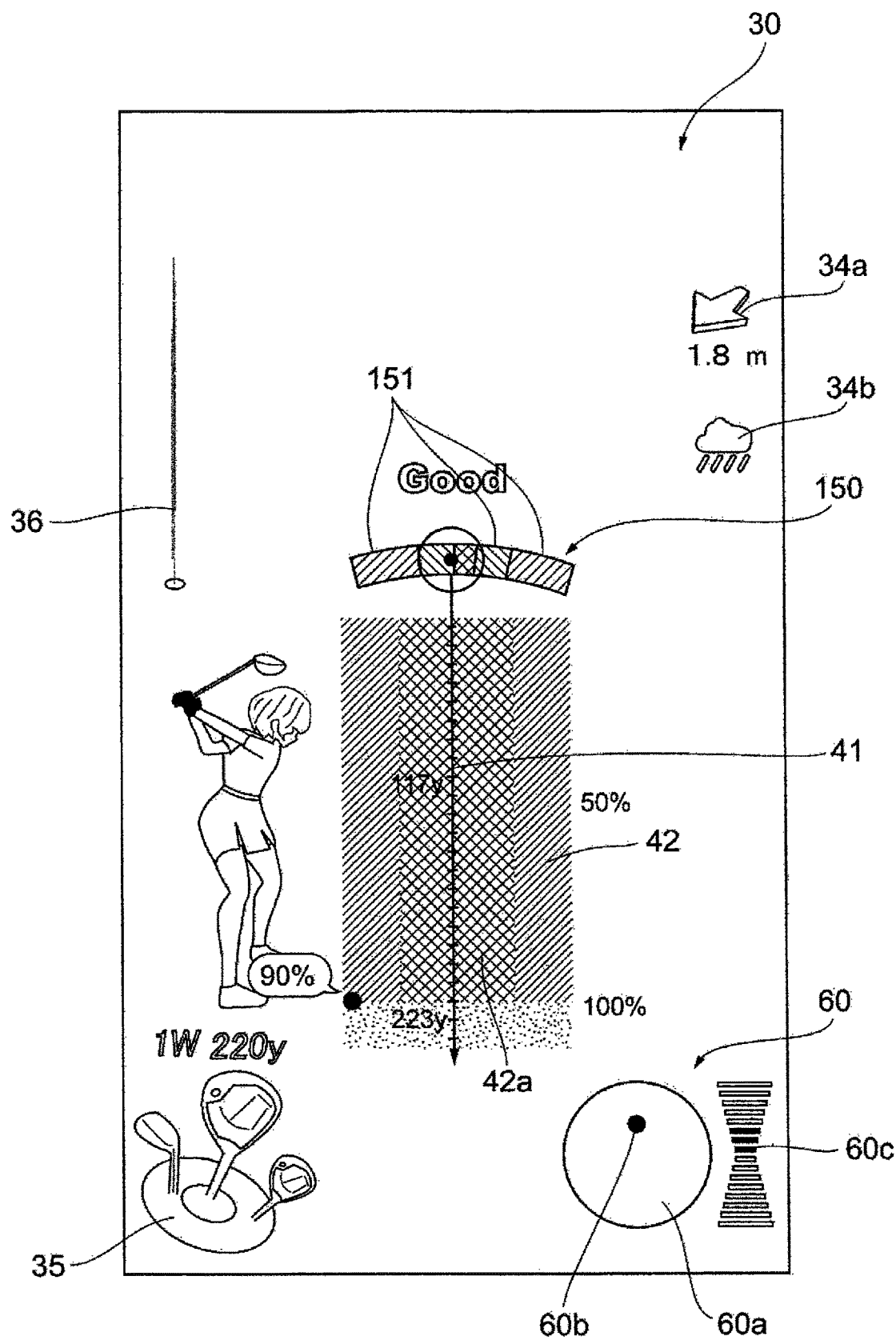
F I G. 15

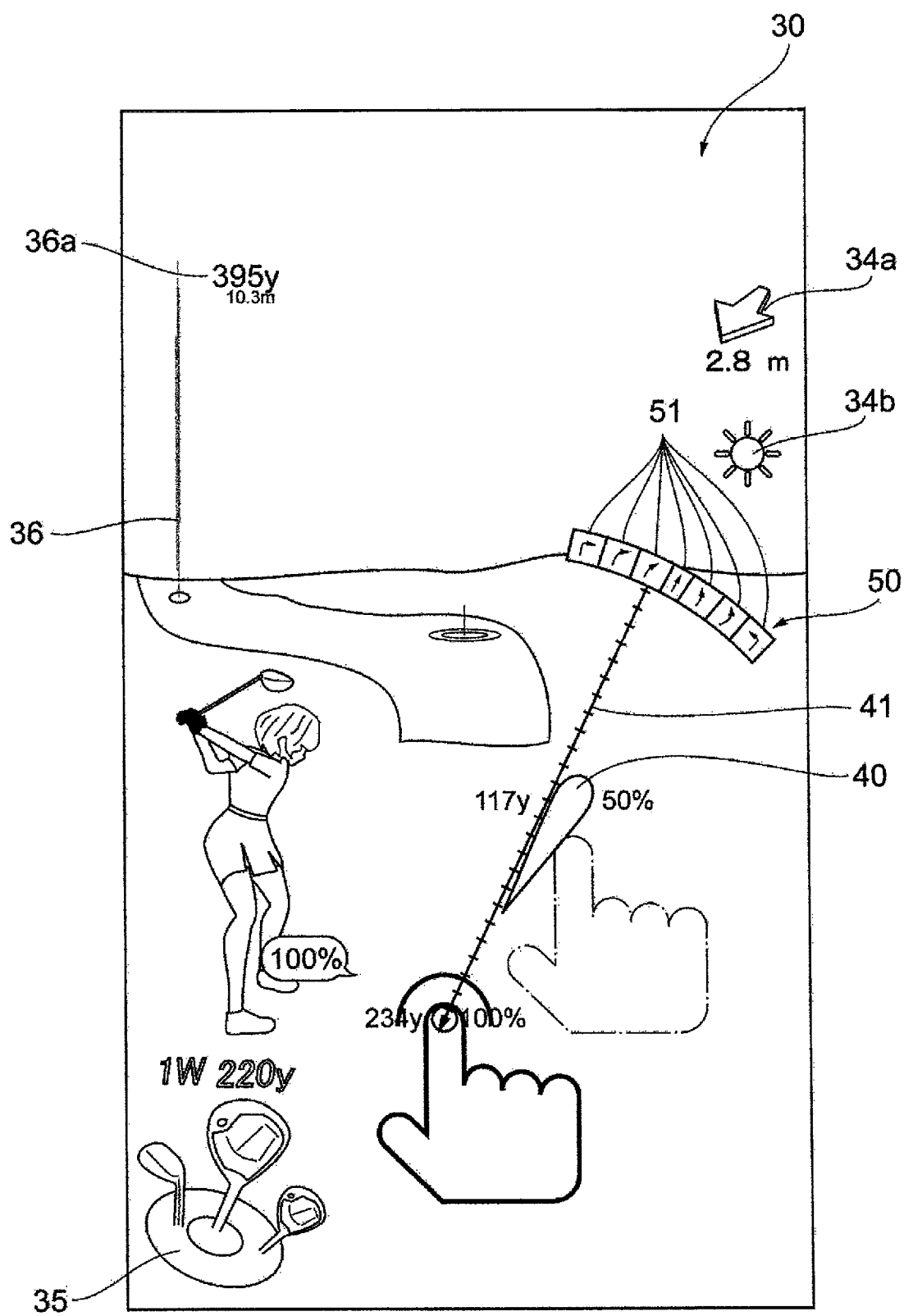
F I G. 16

NON-TRANSITORY COMPUTER-READABLE MEDIUM STORING GAME PROGRAM, AND GAME SYSTEM

CROSS-REFERENCE TO RELATED APPLICATION

This application is a continuation application of International Application No. PCT/JP2020/046874, filed Dec. 16, 2020, which claims priority to Japanese Patent Application No. 2019-239759 filed Dec. 27, 2019, the entire contents of which are incorporated herein by reference.

FIELD

The present invention relates generally to a non-transitory computer-readable medium storing a game program, and a game system.

BACKGROUND

A game system providing a user interface in which an input operation of a user is accurately reflected in a shot has been disclosed (for example, see Patent Document 1 below).

CITATION LIST

Patent Literature

Patent Document 1: Jpn. Pat. Appln. KOKAI Publication No. 2012-125335

SUMMARY

Technical Problem

In the invention according to Patent Document 1, in a golf game, a shot direction is determined by stopping a figure (arrow) rotating at a predetermined angular velocity in a predetermined area, and a power of the shot is determined in a state of a backswing action of a character. In the invention according to Patent Document 1, since these operations are performed by a single operation, the operability is excellent. However, in the invention according to Patent Document 1, it is not possible to provide an operation in which an action relating to a shot of the character from the backswing to the impact is transmitted to the player, and concerns exist that amusement of the game may be diminished.

An object of one aspect of the present disclosure is to enhance amusement of a game.

Solution to Problem

A non-transitory computer-readable medium according to the present disclosure is a non-transitory computer-readable medium storing a game program causing a processor of a terminal device used by a user to execute: displaying a first object including an indication relating to a shot of a ball; receiving an input operation of the user; displaying a second object that moves in accordance with the input operation; and executing the shot in accordance with the indication determined by a positional relationship between the first object and the second object that has moved in accordance with the input operation.

A game method according to the present disclosure includes, by a processor: displaying a first object including an indication relating to a shot of a ball; receiving an input operation of the user; displaying a second object that moves in accordance with the input operation; and executing the shot in accordance with the indication determined by a positional relationship between the first object and the second object that has moved in accordance with the input operation.

A game system according to the present disclosure includes: a first display unit for displaying a first object including an indication relating to a shot of a ball; a reception unit for receiving an input operation of a user; a second display unit for displaying a second object that moves in accordance with the input operation; and a shot execution unit for executing the shot in accordance with the indication determined by a positional relationship between the first object and the second object that has moved in accordance with the input operation.

Advantageous Effects of Invention

According to one aspect of the present disclosure, an effect of enhancing a game amusement is provided.

BRIEF DESCRIPTION OF THE DRAWINGS

FIG. 1 is a schematic configuration diagram of a game system 1.

FIG. 5 illustrates a ball landing indication as viewed from above the game space.

FIG. 7 is an example of a display image including an example of a moving object.

FIG. 10 is an example of a display image showing a state in which the moving object moves.

FIG. 14 is an example of a display image showing a state in which the moving object according to the second embodiment moves.

FIG. 15 is an example of a display image showing a state in which the moving object according to the second embodiment has reached the indication object.

FIG. 16 is an example of a display screen including an indication object and a moving object according to a third embodiment.

DETAILED DESCRIPTION

Figure 2:
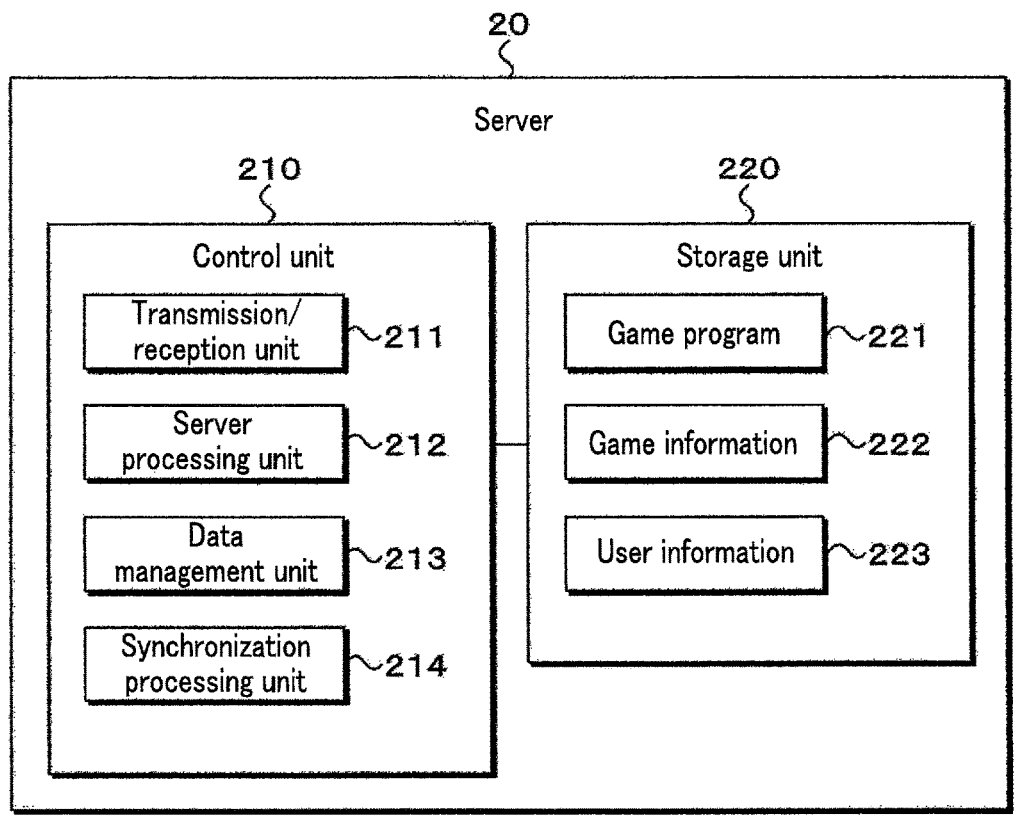
FIG. 2 is a block diagram illustrating a functional configuration of a server.

Hereinafter, embodiments of the present invention will be described in detail with reference to the drawings. The same components are denoted by the same reference numerals, and overlapping descriptions will be omitted.

===System Configuration of Game System===

FIG. 1 is a schematic configuration diagram of a game system 1 including a terminal device 10 according to an embodiment of the present invention. As shown therein, the game system 1 according to the present embodiment includes a plurality of terminal devices 10 and a server 20.

The terminal devices 10 and the server 20 are connected via a network N. The network N may be any one of, for example, the Internet, a mobile communication system (for example, 3G, 4G, 5G, Long Term Evolution (LTE), and the like), Wireless Fidelity (WiFi), Bluetooth (trademark), other communication lines, a combination thereof, or the like, and may be wired or wireless.

==Hardware Configuration of Server==

The server 20 may be a general-purpose computer such as a workstation or a personal computer. As shown in FIG. 1, the server 20 includes, for example, a processor 21, a memory 22, a storage 23, a communication interface (IF) 24, and an input/output IF 25, as physical components. These components included in the server 20 are connected to each other by a communication bus.

The processor 21 controls the entire operation of the server 20. The processor 21 may include a central processing unit (CPU), a micro processing unit (MPU), a graphics processing unit (GPU), and the like. The processor 21, for example, reads a program from the storage 23, loads the program into the memory 22, and executes the loaded program.

The memory 22 is a main storage device. The memory 22 is configured by, for example, a read only memory (ROM) and a volatile storage device such as a random access memory (RAM). The memory 22 provides a work area to the processor 21 by temporarily storing various programs and data read from the storage 23 by the processor 21. The memory 22 also temporarily stores various kinds of data generated while the processor 21 operates according to the program.

Note that the program according to the present embodiment is, for example, a game program that realizes a game through cooperation between the plurality of terminal devices 10 and the server 20. The various types of data include, for example, data relating to a game such as game information, user information, and instructions and notifications transmitted and received among the terminal devices 10 and the server 20.

The storage 23 is an auxiliary storage device. The storage 23 is configured by, for example, a nonvolatile storage device such as a flash memory or a hard disk drive (HDD). The storage 23 stores various kinds of data relating to a game.

The communication IF 24 controls the transmission and reception of various data in the server 20.

The input/output IF 25 is an interface through which the server 20 receives data entry and through which the server 20 outputs data. The input/output IF 25 can include, for example, an input unit as an information input device such as a mouse and a keyboard, and a display unit as a device for displaying and outputting an image.

==Hardware Configuration of Terminal Device==

The terminal device 10 may be, for example, a mobile terminal such as a smartphone, a feature phone, a personal digital assistant (PDA), or a tablet computer. The terminal device 10 is preferably a portable terminal that can be used as a player when a user executes a computer game.

As illustrated in FIG. 1, the terminal device 10 includes, for example, a processor 11, a memory 12, a storage 13, a communication IF 14, an input/output IF 15, and a touch screen 16, as physical components. These components included in the terminal device 10 are connected to each other by a communication bus.

The processor 11 controls the entire operation of the terminal device 10. The processor 11 may include a CPU, an MPU, a GPU, and the like. The processor 11, for example, reads a program from the storage 13, loads the program into the memory 12, and executes the loaded program.

The memory 12 is a main storage device. The memory 12 is configured by, for example, a ROM and a volatile storage device such as a RAM. The memory 12 provides a work area to the processor 11 by temporarily storing programs and various kinds of data read from the storage 13 by the processor 11. The memory 12 also temporarily stores various kinds of data generated while the processor 11 operates according to the program.

The storage 13 is an auxiliary storage device. The storage 13 is configured by, for example, a nonvolatile storage device such as a flash memory or an HDD. The storage 13 stores, for example, various kinds of data relating to a game.

The communication IF 14 controls the transmission and reception of various data. The communication IF 14 controls, for example, communication via a wireless local area network (LAN), a mobile telephone network, or the like, and communication using near field communication or the like.

The input/output IF 15 is an interface through which the terminal device 10 receives data entry and through which the terminal device 10 outputs data. The input/output IF 15 may perform data input and output via, for example, a universal serial bus (USB) and the like. The input/output IF 15 may include, for example, a physical button, a camera, a microphone, a speaker, and the like included in the terminal device 10.

The touch screen 16 is an electronic component in which an input unit 17 and a display unit 18 are combined. The input unit 17 is configured by a touch pad, for example. The display unit 18 is configured by, for example, a liquid crystal display, an organic electro-luminescence (EL) display, or the like.

The input unit 17 includes functions of detecting an input position on the input surface by a user operation (for example, a touch operation, a tap operation, a slide operation, a swipe operation, a flick operation, or the like), and transmitting information indicating the detected position as an input signal. The input unit 17 can include, for example, a touch sensing unit. The touch sensing unit can adopt, for example, a capacitance method, a resistance film method, and the like, but may adopt another method.

==Functional Configuration of Server==

FIG. 2 is a block diagram illustrating a functional configuration of the server 20. The server 20 of the present embodiment has, for example, a function of providing each terminal device 10 with various kinds of data and programs necessary for realizing a game, a function of collecting and managing data relating to the game from each terminal device 10, a function of performing synchronization processing between the plurality of terminal devices 10, and the like.

In the present embodiment, the server 20 identifies each user and terminal device 10 by using a user account registered in advance for each game. A registration method is not particularly limited. For example, the terminal device 10 or another device such as a personal computer transmits information necessary for user account registration to the server 20 in accordance with an operation of the user, and the server 20 can create and store an account for each user based on the received information.

As shown in FIG. 2, the server 20 includes, for example, a control unit 210 and a storage unit 220, as functional components. The storage unit 220 stores various kinds of data used by the control unit 210. Examples of the various kinds of data include, for example, a game program 221, game information 222, and user information 223.

The game program 221 is a program for realizing a game. The game information 222 and the user information 223 are data referred to when the control unit 210 executes the game program 221.

The game program 221 may include a program (a game program 121 described later) transmitted to the terminal device 10 and executed on the terminal device 10 side, in addition to the game program executed on the server 200 side. Alternatively, the storage unit 220 may store the game program 221 executed on the server 200 side, and a program executed on the terminal device side.

The game information 222 is information common to accounts. The game information 222 includes, for example, information for defining various game spaces. The game space is a space in which an object of a character that can be operated by the user (hereinafter also referred to as an "operated character") is placed. The game information 222 includes, for example, various kinds of setting information relating to objects common among accounts, such as arrangement positions, sizes, colors, and shapes of background objects such as buildings, trees, and stones and objects of non-player characters (NPCs) arranged in the game space. In addition, the game information 222 includes, for example, setting values of various parameters of non-player characters and information relating to quests. The quest is an event in the game for which an achievement condition is set. In this quest, a failure condition may be set in addition to the achievement condition. Hereinafter, an object of a character arranged in the game space may also be simply referred to as a "character".

The user information 223 is information managed for each account of the game. The user information 223 includes, for example, information relating to an operated character, information relating to possessed assets, information indicating a game progress level, and the like. Examples of the possessed assets include an in-game currency, items, character equipment, and the like.

The control unit 210 executes the game program 221 stored in the storage unit 220 to control various kinds of processing relating to the game. The control unit 210 includes, for example, a transmission/reception unit 211, a server processing unit 212, a data management unit 213, and a synchronization processing unit 214.

The transmission/reception unit 211 transmits or receives various kinds of data. For example, the transmission/reception unit 211 receives, from each terminal device 10, a transmission request for various kinds of data and programs, a request for synchronization processing for supporting a multiplayer play function, data to be subjected to the synchronization processing, and the like, and passes them to the server processing unit 212. The transmission/reception unit 211 transmits, to each terminal device 10, various kinds of data and programs including instructions or the like for synchronization under the control of the server processing unit 212.

In the present embodiment, a multiplayer play function is a function of actuating game processing performed by a plurality of accounts to progress in a synchronized state. If a plurality of accounts logged in to the game system 1 participate in the same game, the server 20 and the terminal devices 10 of the game system 1 execute various kinds of processing for supporting the multiplayer play function.

The server processing unit 212 executes arithmetic processing described in the game program 221 in response to a request or the like from the terminal device 10 to provide a game to the terminal device 10. For example, upon receiving a request for synchronization processing for supporting the multiplayer play function or data to be subjected to synchronization processing from the terminal device 10 via the transmission/reception unit 211, the server processing unit 212 executes synchronization processing for supporting the multiplayer play function. The server processing unit 212 issues a command to the transmission/reception unit 211 to transmit the game information 222 or the user information 223. Furthermore, the server processing unit 212 issues a command to the data management unit 213 to add, update, or delete a record of the game information 222 or the user information 223.

The data management unit 213 manages various kinds of data stored in the storage unit 220 according to an instruction from the server processing unit 212. For example, the data management unit 213 reads the game information 222 or the user information 223 in accordance with a command from the server processing unit 212, and transmits the information to the terminal device 10 via the transmission/reception unit 211. Furthermore, the data management unit 213 adds, updates, or deletes a record of the game information 222 or the user information 223 in accordance with a command from the server processing unit 212.

The synchronization processing unit 214 executes synchronization processing for supporting the multiplayer play function of the game in accordance with a command from the server processing unit 212. For example, when the server 20 transmits information to a plurality of terminal devices 10, the synchronization processing unit 214 synchronizes the game that is progressing between the terminal devices 10 by simultaneously transmitting information to each of the terminal devices 10. Specifically, the synchronization processing unit 214 simultaneously transmits operation information received from the terminal device 10 corresponding to each account within a predetermined period (for example, one frame) to each terminal device 10 for each predetermined period. The operation information is information on an operation input to the terminal device 10. The timing of synchronization and information to be synchronized may be received from the server processing unit 212 at any time. Through execution of synchronization processing, an event in the game caused by an operation input in one terminal device 10 can be simultaneously reflected in another terminal device 10.

==Functional Configuration of Terminal Device==

Figure 3:
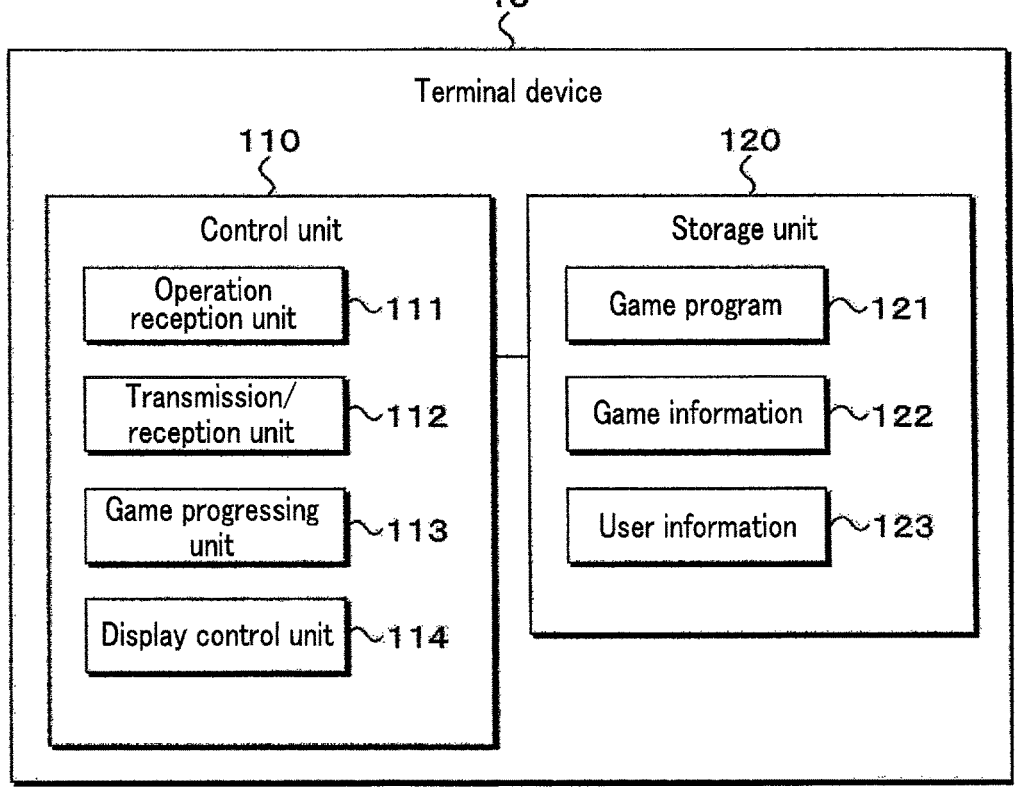
FIG. 3 is a block diagram illustrating a functional configuration of a terminal device.

FIG. 3 is a block diagram illustrating a functional configuration of the terminal device 10. The terminal device 10 in the present embodiment has, for example, a function as an input device receiving an input operation of a user, a function as an output device outputting an image or sound of a game, and the like.

As shown in FIG. 3, the terminal device 10 includes, for example, a control unit 110 and a storage unit 120 as functional components. The storage unit 120 stores various kinds of data used by the control unit 110. Examples of the various kinds of data include, for example, a game program 121, game information 122, and user information 123.

The game program 121 is a program for realizing a game on the terminal device 10 side. The game information 122 and the user information 123 are data referred to when the control unit 110 executes the game program 121.

Since the game information 122 includes information similar to the game information 222 of the server 20 described above, a description of the game information 122 is omitted here.

The user information 123 is data relating to an account of a user who uses the terminal device 10, and includes information similar to the user information 223 of the server 20 described above. Therefore, a description of the user information 123 is omitted here.

The control unit 110 executes the game program 121 stored in the storage unit 120 to control various kinds of processing relating to the game executed in the terminal device 10. The control unit 110 includes, for example, an operation reception unit 111, a transmission/reception unit 112, a game progressing unit 113, and a display control unit 114.

The operation reception unit 111 receives an operation input by the user via the input unit 17 of the touch screen 16 (hereinafter also referred to as an "input operation"). Specifically, if receiving an input operation for the input unit 17, the operation reception unit 111 detects coordinates of the input position and a type of the input operation. Examples of the type of the input operation include a touch operation, a tap operation, a slide operation, a swipe operation, and a flick operation. The input operation is not limited to an operation of physical contact on the touch screen 16, and may include a non-contact operation. If detecting, for example, termination of the continuously detected input operation, the operation reception unit 111 detects that the input operation for the input unit 17 has been released.

Here, the operation reception unit 111 can also receive an operation input by the user using an operation device connected via the input/output IF 15 in the same manner as the input operation for the input unit 17.

The transmission/reception unit 112 transmits and receives various kinds of data. Hereinafter, concrete examples will be described.

The transmission/reception unit 112 transmits, to the server 20, the game information 122, the user information 123, or a synchronization request for supporting the multi-player play function. The transmission/reception unit 112 receives, from the server 20, various kinds of data, programs, data for synchronization for supporting the multi-player play function, and the like. The data for synchronization includes, for example, synchronization instruction data for instructing the terminal devices 10 participating in the multiplayer play to establish synchronization therebetween. The synchronization instruction data includes, for example, data to be synchronized, a type of the data, data for specifying a synchronization timing, and the like.

The transmission/reception unit 112 transmits, to the server 20, operation information relating to the operation received by the operation reception unit 111 (hereinafter also referred to as "first operation information"). The transmission/reception unit 112 receives, from the server 20, operation information relating to an operation input by another user in another terminal device 10 (hereinafter also referred to as "second operation information").

The game progressing unit 113 executes various kinds of processing relating to the progress of the game. Hereinafter, concrete examples will be described.

The game progressing unit 113 defines a game space based on information for defining game spaces included in the game information 122. The game progressing unit 113 arranges objects in the game space based on object setting information included in the game information 122. The game progressing unit 113 controls the objects arranged in the game space. Specifically, the game progressing unit 113 controls the objects so as to change positions, directions, shapes, colors, and the like of the objects in the game space or to cause the objects to perform predetermined actions.

The game progressing unit 113 defines a virtual camera for specifying a region to be presented to the user in the game space. The game progressing unit 113 arranges the virtual camera in the game space by defining a position and a direction of the virtual camera in the game space. The game progressing unit 113 instructs the display control unit 114 to generate an image in which a region of a field of view defined by the virtual camera and an object arranged in the field of view region are rendered.

The position and direction of the virtual camera can be appropriately determined for each game space. For example, the game progressing unit 113 arranges the virtual camera in such a manner that a specific object is positioned at the center of the field of view region in a specific direction with reference to the position and direction of the specific object. At this time, the game progressing unit 113 adjusts the position and direction of the virtual camera using the direction, distance, and angle with respect to the specific object. The specific object may be, for example, a dynamic object such as an operated character or non-player character, or may be a static object such as a building, tree, or stone. The dynamic object includes an operated character that moves based on an operation of each user, and a character (for example, a non-player character, an enemy character, or the like) that moves based on the game programs 121 and 221.

The game progressing unit 113 interprets the instruction content of the user based on the coordinates of the input position, the type of the input operation, and the like, detected by the operation reception unit 111. The game progressing unit 113 executes various kinds of determination processing relating to the progress of the game based on the interpreted instruction content, and the like. The game progressing unit 113 progresses the game while controlling the object, the virtual camera, and the like, based on the result of the determination processing and the like. The game progressing unit 113 updates, adds, or deletes the game information 122 or the user information 123 in accordance with the progress status of the game.

The display control unit 114 causes the display unit 18 to display an image. Hereinafter, concrete examples will be described.

The display control unit 114 generates an image in which a region of a field of view of the virtual camera defined by the game progressing unit 113 and an object present in that region are rendered in the game space, and causes the display unit 18 to display the image. The display control unit 114 can render an image by superimposing an object relating to a user interface (UI) necessary for various operations of the game, such as an icon, a button, and a menu indicating various parameters, on the image displayed on the display unit 18.

Processing According to Present Embodiment

Next, processing executed by the terminal device 10 will be described. The processing executed by the terminal device 10 includes, for example, space display processing, indication display processing, and shot execution processing. Details of the space display processing, the indication display processing, and the shot execution processing will be described below. Note that in the following description, the processing executed by the terminal device 10 is applied to a golf game by way of example; however, the processing may be applied to, for example, a general shot game in which a ball is shot using a tool or a game in which a ball is thrown.

<<Space Display Processing>>

Figure 4:
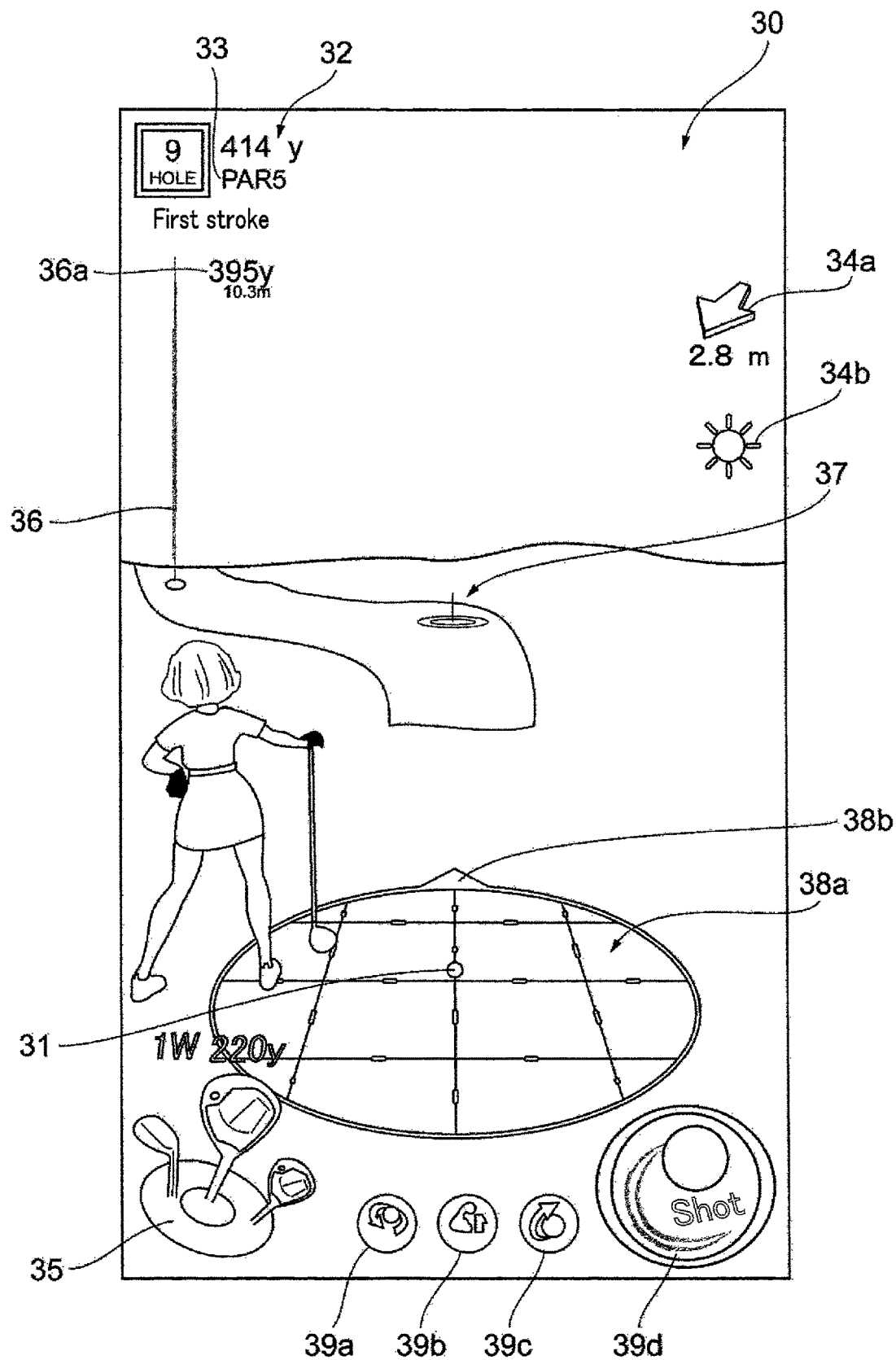
FIG. 4 is an example of a display screen showing a game space showing a space including a course.

FIG. 4 is an example of a display screen showing a game space 30 showing a space including a golf course. With reference to FIG. 4, the game space 30 and various objects superimposed and displayed on the game space 30 will be described.

The display control unit 114 causes the display unit 18 to display an image indicating the game space 30 in response to an instruction from the game progressing unit 113. Specifically, the display control unit 114 generates an image in which a region of a field of view of the virtual camera defined by the control unit 110 in the game space 30 and an object present in the region are rendered, and causes the display unit 18 to display the image. In addition, the display control unit 114, for example, renders an image by superimposing objects related to a user interface (UI) necessary for various game operations, such as an icon, a button, a menu indicating various parameters, and the like, on the image. Examples of the objects will be described below.

As shown in FIG. 4, the objects displayed on the display screen may include, for example, a ball 31 shot by the operated character, a distance object 32 indicating a distance of a course, a stroke number object 33 indicating the number of strokes for par, a wind direction object 34a indicating a wind direction, a weather object 34b indicating weather, a club object 35 indicating clubs used by the operated character, a cup indication 36 indicating a position of a cup, a cup distance object 36a indicating a distance between the ball 31 and the cup indication 36, a ball landing indication 37 indicating a landing point of the ball 31, an inclination indication 38a at a position of the ball 31, a direction indication 38b indicating a direction of the shot, a first function activation button 39a, a second function activation button 39b, and a third function activation button 39c, and a transition button 39d for shifting to the indication display processing described later.

The cup indication 36 is, for example, an indication displayed in such a manner that the light of a predetermined color extends from the cup hole. The game progressing unit 113 sets, for example, the cup indication 36 in such a manner that the closer to the cup hole, the darker the color, and the farther from the cup hole, the lighter the color. The game progressing unit 113 sets, for example, the cup indication 36 to a color distinguishable from the color of the lawn of the course. If the cup indication 36 is displayed, a player can easily visually recognize the position of the cup hole in the game space 30 projected from behind the operated character. Thereby, the game play of the player can proceed smoothly, and the game amusement enhanced.

Figure 6:
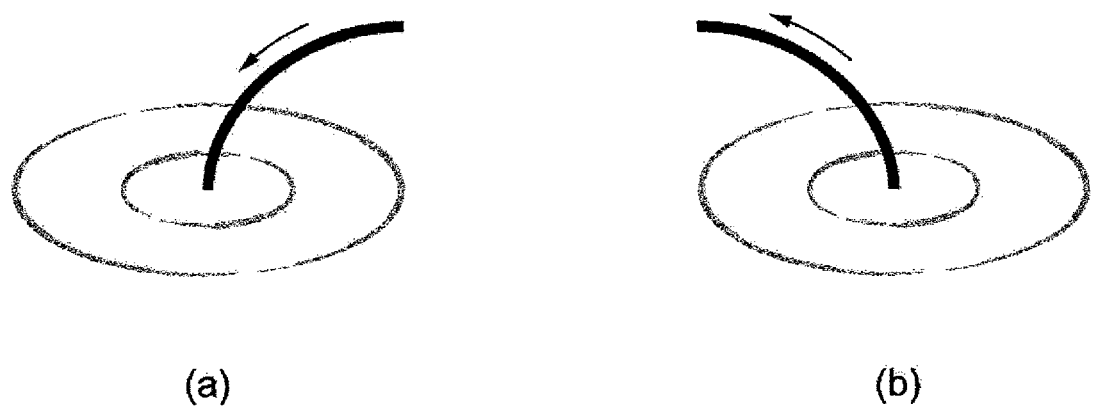
FIG. 6 illustrates the ball landing indication viewed from a direction perpendicular to a shot direction.

The ball landing indication 37 is, for example, an indication displaying an estimated landing point for the ball 31. FIG. 5 illustrates the ball landing indication 37 viewed from above the game space 30. FIG. 6 illustrates the ball landing indication 37 viewed from a direction perpendicular to the shot direction. As shown in FIG. 5, the game progressing unit 113 represents the ball landing indication 37 with, for example, a so-called ripple in such a manner that a ring spreads around an estimated ball landing point.

As shown in FIG. 6, the game progressing unit 113 represents the ball landing indication 37 with, for example, a line object when the flying ball 31 lands on the ground (FIG. 6(a)), and represents it with a line object when the flying ball 31 bounces thereafter on the ground (FIG. 6(b)). Here, the estimated ball landing point is, for example, a point where the ball 31 falls as a result of the best shot of the selected club. The game progressing unit 113 estimates the estimated ball landing point based on, for example, a shot direction of the operated character, a type of a golf club used by the operated character, characteristics (physical strength, level, etc.) of the operated character, weather conditions (amount of rain, amount of wind, wind direction, etc.) of the golf course, and the like. If the ball landing indication 37 is displayed, the player can easily visually recognize the estimated ball landing point. Thereby, the game amusement is enhanced.

The game progressing unit 113 may provide a drop region indication 37a around the ball landing indication 37. The drop region indication 37a is, for example, as shown in FIG. 5, a matrix-shaped indication in which a plurality of reference points are provided in a predetermined region around the ball landing indication 37 and the plurality of adjacent reference points are connected by grid lines. The grid lines are deformed in accordance with a geographic undulation, and the luminance is set by the difference in height between points. If the drop region indication 37a is displayed, the player can easily visually recognize the geographic undulation around the ball landing indication 37. Thereby, the player can easily grasp the shape of the course, and the game amusement is enhanced.

The inclination indication 38a is, as shown in FIG. 4, an indication, for example, indicating an inclination of the ground around the ball 31. The game progressing unit 113 may provide a plurality of reference points in a predetermined region around the ball 31 and connect the plurality of reference points adjacent to each other with grid lines to set the reference points in a matrix. The game progressing unit 113 sets an object moving on the grid line at a speed corresponding to the degree of inclination of the ground. Thereby, the game amusement is enhanced.

The direction indication 38b is, as shown in FIG. 4, an indication, for example, indicating, with an arrow, a direction in which the player makes a shot, on the peripheral portion of a circle drawn around the ball 31. Thereby, the shot operability can be improved, and the game amusement is enhanced.

The first function activation button 39a is, for example, an activation button for a function of increasing the power of a shot described later at a predetermined magnification. Specifically, if the predetermined magnification is set to "1.5 times", the game progressing unit 113 sets, when the first function activation button 39a is selected, the power of "100%" in the power indication 41 described later to "150%". Thereby, the game amusement is enhanced.

The second function activation button 39b is, for example, an activation button for a function of automatically putting the ball 31 into the cup when the ball 31 enters a predetermined range around the cup. Specifically, when the second function activation button 39b is selected, the game progressing unit 113 provides an indication distinguishing from other regions in a 3m radius range around the cup, and guides the ball 31 to the cup if it is determined that the shot ball 31 enters the range of the indication. Thereby, the game amusement is enhanced.

The third function activation button 39c is, for example, an activation button for a function of limiting a symbol of indication regions 51 of the indication object 50 to be described later to a specific symbol and displaying the specific symbol. Specifically, the game progressing unit 113, for example, unifies the symbol of the indication object 50 to an arrow indicating straight. Thereby, the game amusement is enhanced.

<<Indication Display Processing>>

Figure 8:
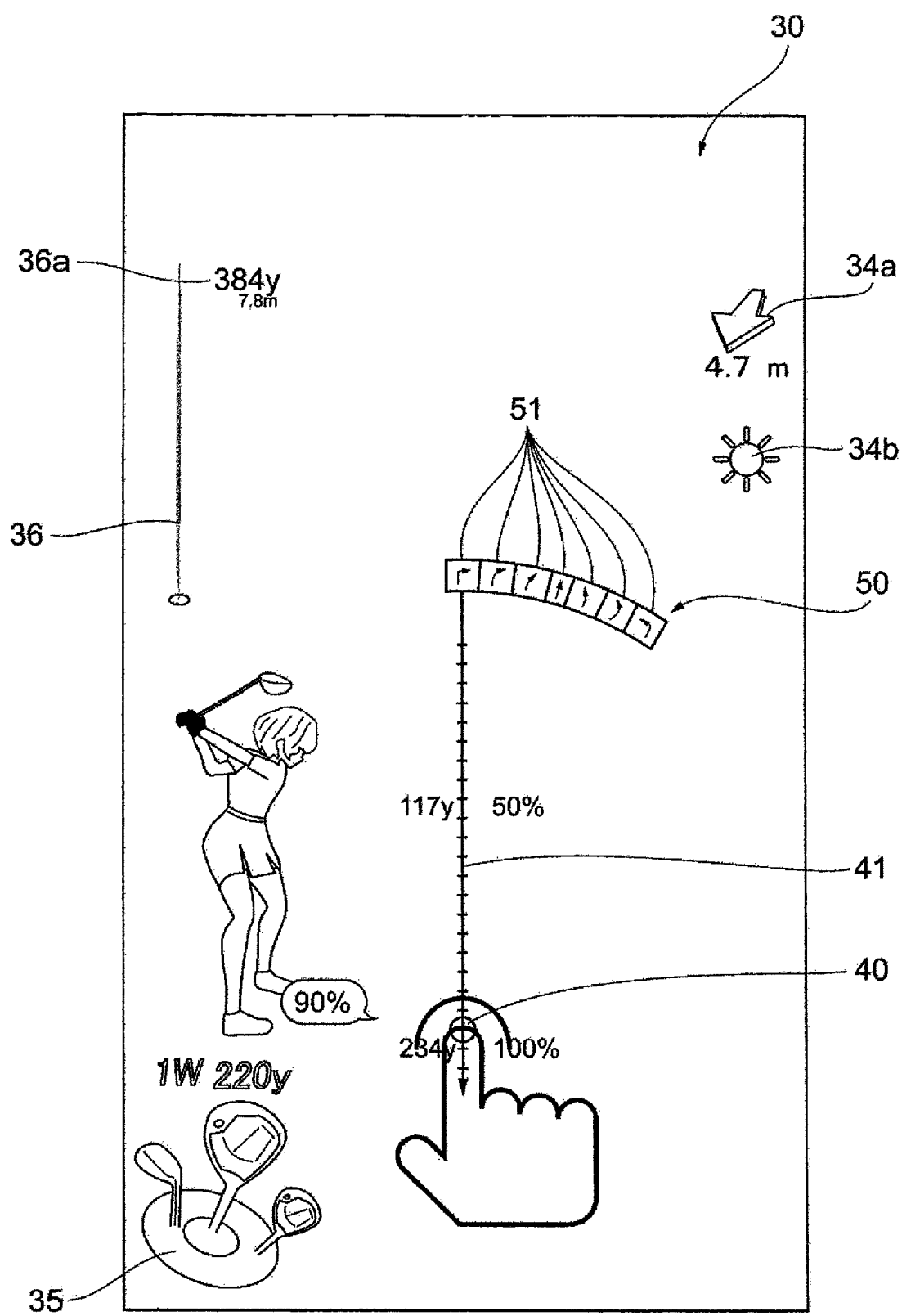
FIG. 8 is an example of a display image including an example of an indication object.
Figure 9:
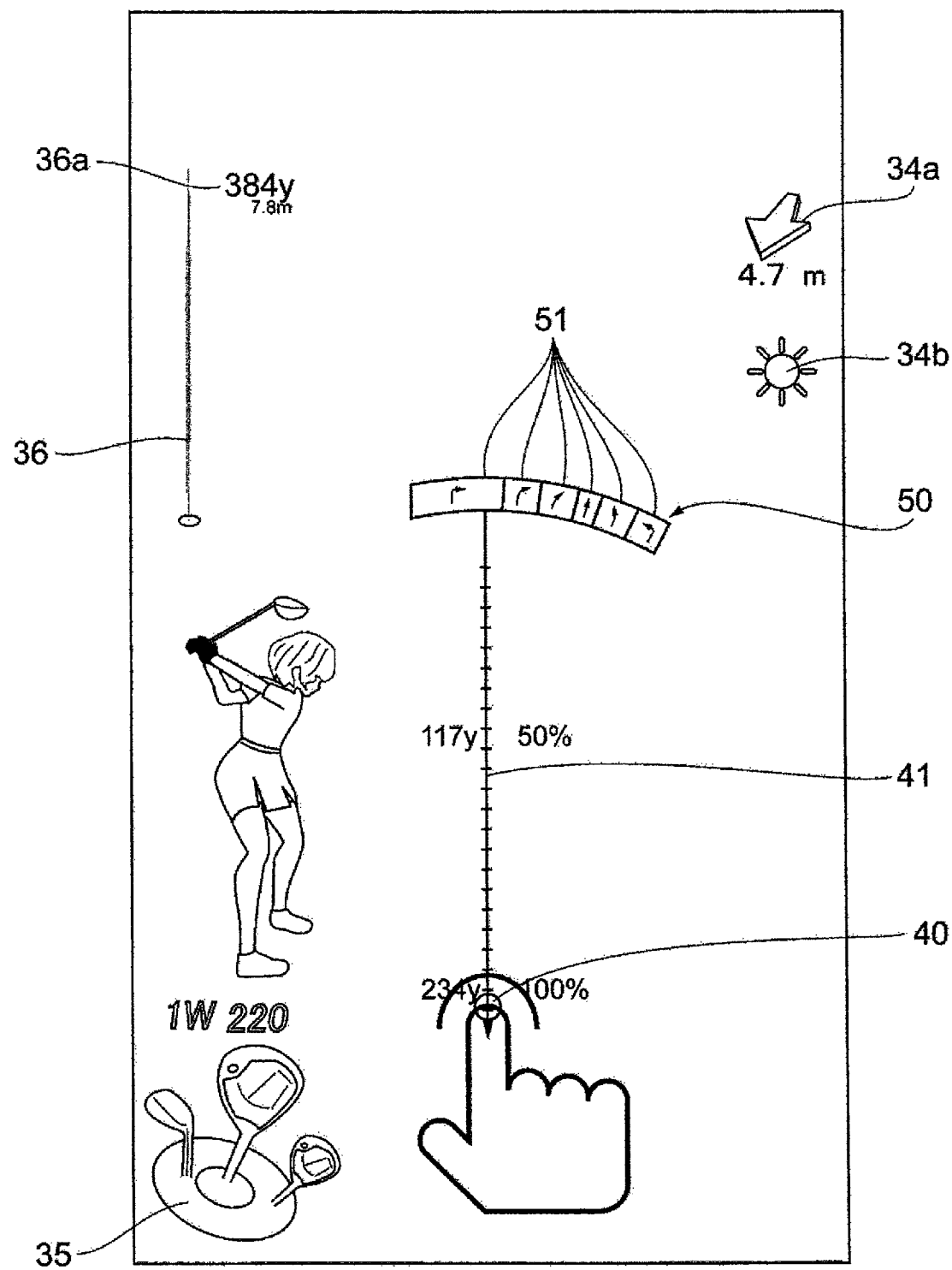
FIG. 9 is an example of a display image including another example of the indication object.

FIG. 7 is an example of a display image including an example of a moving object 40. FIG. 8 is an example of a display screen including an example of an indication object 50. FIG. 9 is an example of a display screen including another example of the indication object 50. With reference to FIGS. 7, 8, and 9, details of the indication display processing will be described.

The indication display processing is, for example, the processing for causing the display unit 18 to display the indication object 50 through a predetermined player's input operation for the moving object 40 displayed in the display image.

When the transition button 39*d* is selected by the player, the game progressing unit 113 instructs the display control unit 114 to cause the display unit 18 to display an image indicating a state in which the operated character maintains the posture at address. In addition, the display control unit 114 causes the display unit 18 to display the moving object 40. The moving object 40 will be described below.

As shown in FIG. 7, the moving object 40 is an object that has, for example, a circular shape (not limited to a circular shape), and moves along a linear indication extending from the moving object 40 to a predetermined direction (hereinafter referred to as a "power indication 41").

Here, the power indication 41 is, for example, an indication in which a scale line is provided on a grid and a numerical value indicating the power of a shot is provided. The numerical value indicating the power of the shot is, for example, at least one of a yard indicating a flight distance or a percentage indicating a rate of power. Thereby, the player can easily set the power of the shot, and the game amusement is enhanced.

The operation reception unit 111 receives selection of an arbitrary position on the touch screen 16 by the player. The game progressing unit 113 moves the moving object 40 in accordance with a swipe operation from the selected arbitrary position by the player. Specifically, if it is determined that the touch position of the player on the touch screen 16 overlaps with the moving object 40, the game progressing unit 113 moves the moving object 40 in accordance with the swipe operation of the player. In addition, if it is determined that the touch position of the player on the touch screen 16 is within a predetermined range around the moving object 40, the game progressing unit 113 may move the moving object 40 according to the swipe operation of the player. Thereby, the player can grasp an image of the take-back action of the operated character, and the game amusement is enhanced.

Upon the player's swipe operation for the moving object 40 along the power indication 41, the game progressing unit 113 instructs the display control unit 114 to cause the display unit 18 to display the indication object 50 as shown in FIG. 8. The indication object 50 will be described in detail below.

First, details of the configuration of the indication object 50 will be described.

As shown in FIG. 8, the indication object 50 is an object having, for example, a shape in which a fan-shaped peripheral portion is cut along an outer edge, and including a plurality of divided regions (hereinafter referred to as "indication regions 51"). The indication region 51 includes, for example, a symbol indicating a trajectory of the shot ball 31. Here, the symbol is, for example, an arrow indicating the degree of curvature of the trajectory of the shot ball 31. In the indication object 50, for example, the game progressing unit 113 sets an arrow indicating straight for the center indication region 51 among the plurality of indication regions 51, and sets arrows whose bending angles increase according to the distance from the center. The game progressing unit 113 sets the degree of curvature of the trajectory of the shot ball 31 based on the symbol included in a reach indication 51 described later.

Details of the indication regions 51 will be described below.

The game progressing unit 113 sets the indication regions 51 based on the environment around the ball 31. Specifically, if the ball 31 is present on a fairway, the game progressing unit 113 may form the indication regions 51 in such a manner that the plurality of indication regions 51 have substantially equal display areas (see FIG. 8). On the other hand, if the ball 31 is present off a fairway such as in the rough, on an inclined surface, or in a bunker, the game progressing unit 113 may form the indication regions 51 such that the plurality of indication regions 51 have non-uniform display areas. Moreover, if the ball 31 is present on a surface inclined to one side toward the display screen (display unit 18), for example, the game progressing unit 113 increases an area of the indication region 51 that includes an arrow indicating a degree of curvature of the inclination direction of one side (see FIG. 9). In this case, the game progressing unit 113 may exclude an arrow indicating a degree of curvature of a direction opposite to the inclination direction of one side. Furthermore, the game progressing unit 113 may set display areas and arrows arrangement in the indication regions 51*a* according to the weather. Thereby, it is possible to play a game with mistakes likely to occur in actual golf, and the game amusement is enhanced.

Next, details of the action of the indication object 50 will be described.

The game progressing unit 113 causes the indication object 50 to reciprocate in a direction intersecting with the flying direction of the ball 31 shot by the operated character. Here, the flying direction is a direction in which the ball 31 flies when the player hits the ball 31. Specifically, the game progressing unit 113 causes the indication object 50 to reciprocate at a predetermined angular speed along a predetermined curve while bringing the moving object into contact with one end portion of the power indication 41, for example. Thereby, difficulty in executing an accurate shot can be increased, and the game amusement is enhanced.

The game progressing unit 113 controls the indication object 50 in such a manner that the speed of the reciprocation movement of the indication object 50 increases as the moving object 40 moves away from the indication object 50. Thereby, the higher the power of the shot set by the player, the more difficult it becomes to realize the shot along the trajectory intended by the player, and the game amusement is enhanced.

The game progressing unit 113 may change the moving speed of the reciprocation movement of the indication object 50 based on the position environment of the ball 31. Specifically, the game progressing unit 113 increase the moving speed if the ball 31 is present off a fairway such as in a rough, on an inclined surface, or in a bunker than the moving speed if the ball 31 is present on a fairway. Thereby, the worse the shot-making environment, the greater the difficulty in executing an appropriate shot, and the game amusement is enhanced.

In addition, the game progressing unit 113 may keep the reciprocation speed of the indication object 50 constant until the moving object 40 reaches a predetermined position (for example, 50%) of the power indication 41. Furthermore, the game progressing unit 113 may control the indication object 50 in such a manner that the reciprocation speed of the indication object 50 increases as the moving object 40 moves away from the indication object 50 beyond the predetermined position of the power indication 41. Thereby, the higher the power of the shot set, the harder it becomes to realize a shot along a trajectory intended by the player, and the game amusement is enhanced.

<<Shot Execution Processing>>

Figure 11:
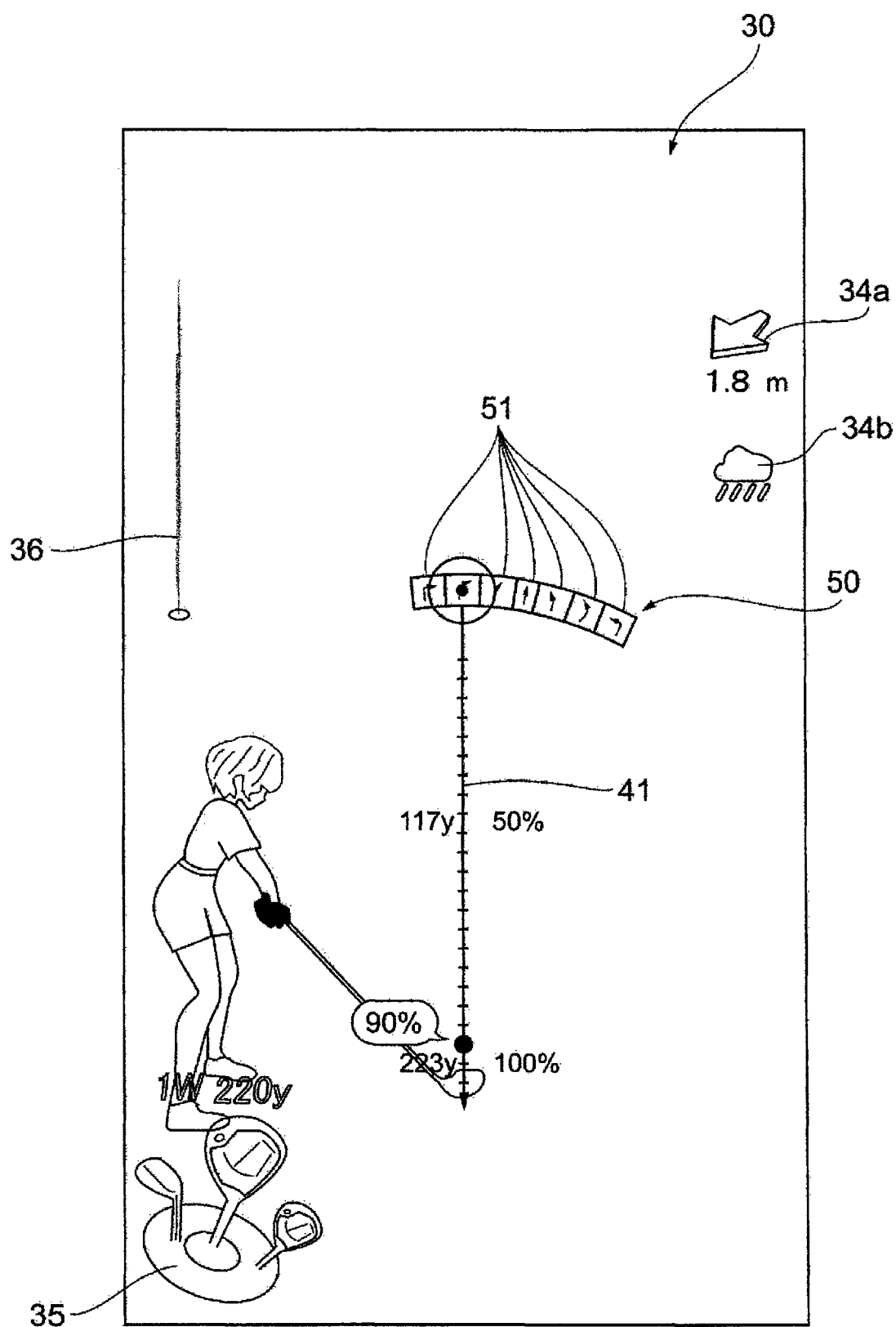
FIG. 11 is an example of a display image showing a state in which the moving object has reached the indication object.

FIG. 10 is an example of a display image showing a state in which the moving object 40 moves. FIG. 11 is an example of a display image showing a state in which the moving object 40 has reached the indication object 50. With reference to FIGS. 8, 10, and 11, details of the shot execution processing will be described.

The shot execution processing is the processing for determining a position of the moving object 40 based on the player's input operation, moving the moving object 40 toward the indication object 50 when the input operation is released, and executing a shot corresponding to the release position of the input operation and the indication of the indication region 51 determined by the positional relationship between the indication object 50 and the moving object 40 after the movement. In other words, the shot execution processing is the processing for determining a ball reach region based on the release position and the indication of the indication region 51 determined by the positional relationship between the indication object 50 and the moving object 40 after movement.

The shot execution processing may include power determination processing and trajectory determination processing.

The power determination processing is, for example, the processing for determining the power of a shot based on the release position when the input operation of the player is released. Specifically, as shown in FIG. 8, the game progressing unit 113 moves the moving object 40 from an arbitrary position selected by the player along the power indication 41 in accordance with a swipe operation by the player. The swipe operation here is, for example, an operation in a direction away from the indication object 50. Thereby, the player can grasp the image of the take-back action of the operated character, and the game amusement is enhanced.

In the power determination processing, the game progressing unit 113 increases the shot power as the distance from the indication object 50 to the moving object 40 determined by the end point of the swipe operation increases. Specifically, the game progressing unit 113 determines, for example, the power according to the power indication 41 corresponding to the release position. For example, the power indication 41 is set in such a manner that a numerical value indicating power increases as the distance from the indication object 50 increases. In FIG. 10, since it is released at a position indicating "90%" of the power indication 41, the power of the shot is "90%" of the maximum power. Thereby, player's operability in determining the power of the shot is improved, and the game amusement is enhanced.

The trajectory determination processing is, for example, the processing for determining a trajectory of a shot based on a positional relationship between the moving object 40 after the movement and the indication object 50. Specifically, as shown in FIG. 10, when the touch on the touch screen 16 is released, the game progressing unit 113 moves the moving object 40 from the release position toward the indication object 50 along the power indication 41. That is, at the same time when the power of the shot is determined, the processing proceeds to the procedure of automatically determining the trajectory of the ball. Thereby, it possible to provide a player with seamless shot operation, and the game amusement is enhanced.

In the trajectory determination processing, the game progressing unit 113 may cause the moving object 40 to move at a constant speed, or may increase the moving speed of the moving object 40 as the distance from the indication object 50 to the release position increases. In addition, the moving speed of the moving object 40 may be increased as the moving object 40 approaches the indication object 50 from the release position. Thereby, a shot is less likely to be realized along a trajectory intended by the player, and the game amusement is enhanced.

In the trajectory determination processing, the game progressing unit 113 may, for example, cause the moving object 40 to have a streamline shape so as to leave a trajectory on a side opposite to the moving direction while the moving object 40 moves toward the indication object 50. At this time, the game progressing unit 113 may form the moving object 40 such that the shape at the time of movement is larger than the shape at the time of the swipe operation. Thereby, it is possible to provide a player with a feeling of actually having played a shot, the game amusement is enhanced.

In the trajectory determination processing, as shown in FIG. 11, the game progressing unit 113 determines the indication region 51 of the indication object 50 reached by the moving object 40 after the movement (hereinafter, referred to as "reach indication 51"). The game progressing unit 113 determines the trajectory of the ball 31 corresponding to the symbol included in the reach indication 51. In FIG. 11, since the moving object 40 has reached the reach indication 51 including a symbol turning to the right toward the display screen, the game progressing unit 113 sets the shot ball 31 to slice (fade). Thereby, the trajectory of the ball can be intentionally curved by the player's operation, and a situation in which the trajectory of the ball is unintentionally curved can be provided to the player, and the game amusement is enhanced.

That is, in the shot execution processing, the game progressing unit 113 determines the ball reach region based on, for example, the power of the shot determined through the power determination processing and the trajectory of the shot ball determined through the trajectory determination processing.

<<Processing Flow>>

Figure 12:
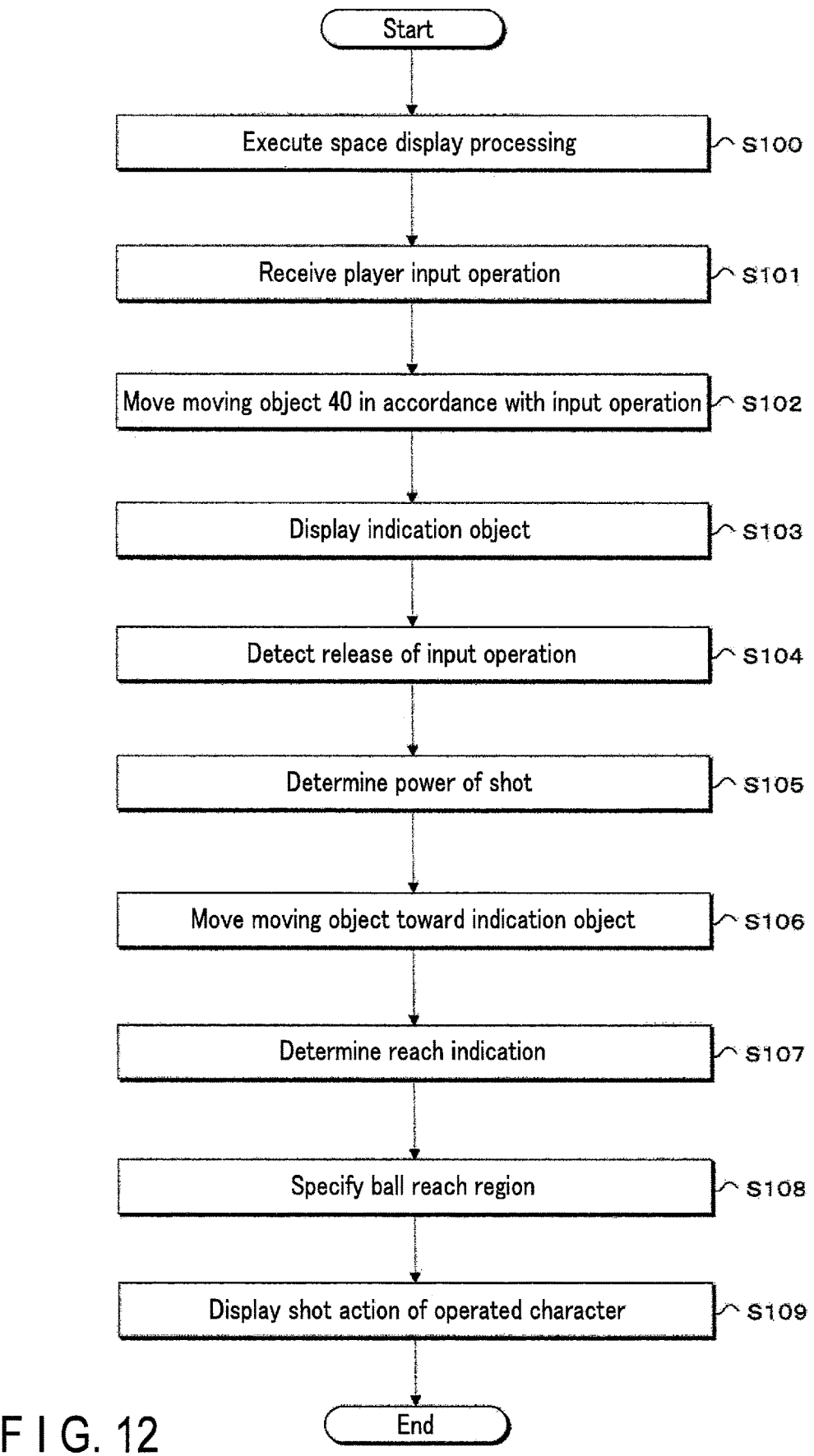
FIG. 12 is a flow diagram showing a flow of processing executed by the terminal device.

Next, with reference to FIG. 12, a flow of processing executed by the terminal device 10 will be described. FIG. 12 is a flow diagram showing a flow of processing executed by the terminal device 10.

In S100, the game system executes the space display processing. As described above, various objects are displayed in the space display processing.

In S101 to S104, the game system executes the indication display processing.

In S101, as shown in FIG. 7, an input operation by a player for the touch screen 16 is received. For example, when it is determined that a predetermined range around the moving object 40 is touched, the game progressing unit 113 proceeds the processing to S102.

Next, in S102, as shown in FIG. 8, the moving object 40 is moved along the power indication 41 in accordance with the swipe operation of the player.

Next, in S103, as shown in FIG. 8, the game progressing unit 113 instructs the display control unit 114 to cause the display unit 18 to display the indication object 50.

In S104 to S109, the game system executes the shot execution processing.

In S104, the game progressing unit 113 detects that the player's contact with the touch screen 16 has been released.

Next, in S105, the game progressing unit 113 determines the release position, and determines the power of the shot corresponding to the release position. In FIG. 10, the power of the shot is determined to be "90%".

Next, in S106, as shown in FIG. 10, the game progressing unit 113 moves the moving object 40 to the indication object 50. At this time, the game progressing unit 113 may change the shape of the moving object 40 (streamline shape in FIG. 10 or the like).

Next, in S107, as shown in FIG. 11, the game progressing unit 113 determines the reach indication of the indication object 50 reached by the moving object 40 after the movement. The game progressing unit 113 determines the trajectory of the ball 31 corresponding to the reach indication.

Next, in S108, the reach region of the ball is specified based on the power of the shot and the reach indication.

Next, in S109, as shown in FIG. 11, the game progressing unit 113 causes the display unit 18 to display an image for causing the operated character to perform a shot action. Then, the game progressing unit 113 causes the display unit 18 to display an image in which the ball 31 flies in accordance with the determined power of the shot and trajectory of the ball 31.

The game system repeatedly executes the procedures from S100 to S109 for each shot.

Processing According to Second Embodiment

Figure 13:
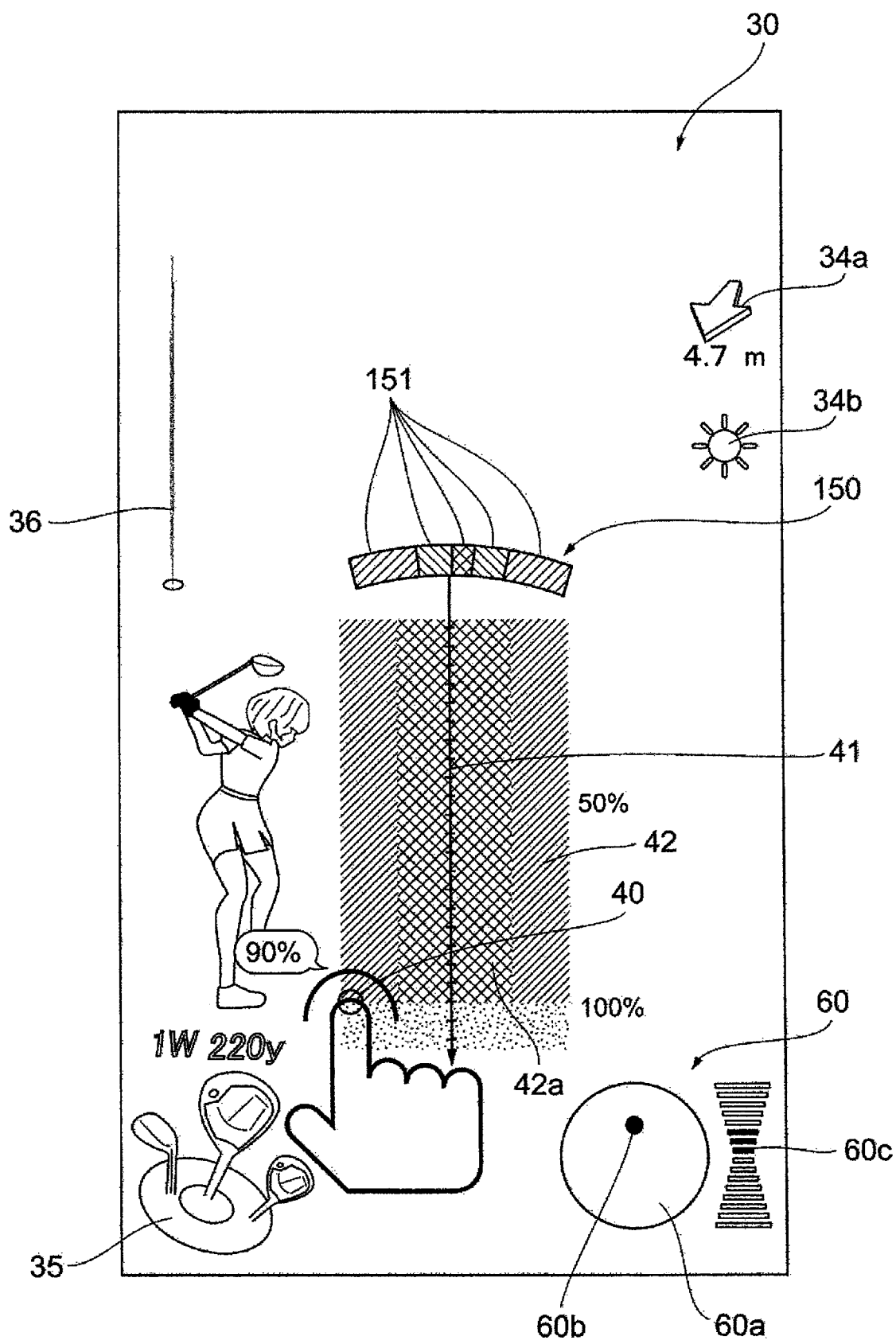
FIG. 13 is an example of a display screen including an indication object and a moving object according to a second embodiment.

FIG. 13 is an example of a display screen including an indication object 150 and a moving object 40 according to the second embodiment. FIG. 14 is an example of a display image showing a state in which the moving object 40 according to the second embodiment moves. FIG. 15 is an example of a display image showing a state in which the moving object 40 according to the second embodiment has reached the indication object 150. With reference to FIGS. 13, 14, and 15, only differences from the above-described contents will be described in detail with respect to the second embodiment.

<<Indication Display Processing>>

Details of the configuration of the indication object 150 according to the second embodiment will be described.

As shown in FIG. 13, an indication region 151 of the indication object 150 is a region indicating accuracy of a shot. Here, the accuracy is, for example, a degree of change in (widening of) the ball reach region specified in the shot execution processing (hereinafter, also referred to as a "degree of change"). The game progressing unit 113 may set the degree of change to increase as the distance from the center indication region 51 of the indication region 151 increases. In other words, the game progressing unit 113 may set the ball reach region to increase as the distance from the center indication region 51 of the indication regions 151 increases. In this case, it is desirable that the game progressing unit 113 expands the reach region toward a direction close to the shot point. Thereby, the game amusement is enhanced.

In addition, the game progressing unit 113 may set, for the indication region 151, a color corresponding to the degree of change set for it. Thereby, the player's operability can be enhanced.

In the following, details the indication regions 151 of the indication object 50 will be described.

The game progressing unit 113 may change the shape of the indication region 151 of the indication object 150 in accordance with the environment around the ball 31. Specifically, as shown in FIG. 13, when the ball 31 is present on the fairway, the game progressing unit 113 may form the indication object 150 such that the display areas of the plurality of indication regions 151 gradually increase as the distance from the center increases. Thereby, it is possible to play a game with mistakes likely to occur in actual golf, and the game amusement is enhanced.

<<Shot Execution Processing>>

As shown in FIG. 13, the game progressing unit 113 sets a region for determining power of a shot and a degree of curvature (hereinafter referred to as a "shot determination region 42"). The shot determination region 42 has, for example, a width, in which the moving object 40 can move, in a direction intersecting the ball flying direction, and the power indication 41 is provided along the ball flight direction so as to pass through the center of the width.

The game progressing unit 113 determines the degree of curvature of the shot ball 31 according to the release position in the shot determination region 42, for example. Specifically, the game progressing unit 113 may increase the degree of curvature of the shot ball toward a direction opposite to the direction in which the release position is away from the power indication 41 as the release position is away from the power indication 41. Thereby, determination of the power of the shot and determination of the trajectory of the shot can be realized by one operation, and the game amusement is enhanced.

In addition, the game progressing unit 113 may set a direction fix region 42a indicating a region in which a shot ball does not curve within a predetermined range around the power indication 41. Thereby, as the player's finger shake is absorbed, the player's operability is improved, and the game amusement is enhanced.

As shown in FIG. 14, the game progressing unit 113 may move the moving object 40 from the release position (movement start position) toward one end portion 41a of the power indication 41. Thereby, the moving object 40 is moved in the same direction as the trajectory of the ball to be shot, and it is possible to provide a player with an image of a shot, and thus the game amusement is enhanced.

Furthermore, the game progressing unit 113 may move the moving object 40 from the release position (movement start position) along the power indication 41 (in a fixed direction). This makes it easier for the moving object 40 to reach the indication object 50 that the player aims at, and the game amusement is enhanced.

As shown in FIG. 15, the game progressing unit 113 may display a message corresponding to the reach indication when the moving object 40 has reached the indication object 50. Specifically, the game progressing unit 113 may display "Perfect" if the moving object 40 has reached the central indication region 151 of the indication object 50, display "Good" if the moving object 40 has reached the indication region 151 next to the central indication region 151, and display "Bad" if the moving object 40 has reached the other indication regions 151. Thereby, the player can easily recognize the reach indication, and the game amusement is enhanced.

The game progressing unit 113 may cause the display unit 18 to display, for example, a spin object 60. As shown in FIG. 13, the spin object 60 includes, for example, a virtual ball object 60a imitating a golf ball, a spin point 60b in the virtual ball object 60a, and a spin meter 60c that is filled according to movement of the spin point 60b. The game progressing unit 113 moves the spin point 60b within the virtual ball object 60a in response to a slide operation on the spin point 60b by the player. The game progressing unit 113 fills a predetermined region of the spin meter 60c according to the position of the moved spin point 60b. The game progressing unit 113 determines the spin state of the shot ball 31 in accordance with the degree of filling of the spin meter 60c.

Specifically, when one direction (upper direction in FIG. 13) of the spin meter 60c is filled, topspin is set for the shot ball 31. If a direction opposite to the one direction (lower direction in FIG. 13) of the spin meter 60c is filled, backspin is set for the shot ball 31. Thereby, it is possible to provide a player with a variation in the behavior of the shot ball at the drop point, and the game amusement is enhanced.

Moreover, the spin meter 60c may be formed so as to be filled in a direction orthogonal to one direction (not shown). In this case, the degree of side spin of the shot ball 31 is determined according to the degree of filling in the orthogonal direction. Thereby, it is possible to provide a player with a variation in the behavior of the shot ball at the drop point, and the game amusement is enhanced.

Processing According to Third Embodiment

FIG. 16 is an example of a display screen including an indication object 50 and a moving object 40 according to the third embodiment. With reference to FIG. 16, only differences from the above-described contents will be described in detail with respect to the third embodiment.

<<Indication Display Processing>>

As shown in FIG. 16, the game progressing unit 113 displays the power indication 41 inclined at a predetermined angle with respect to the ball flight direction. Thereby, since the player can operate the moving object 40 with the thumb of one hand, operation stress of the player is reduced, and the game amusement is enhanced.

<<Shot Execution Processing>>

As shown in FIG. 16, the game progressing unit 113 moves the moving object 40 in a direction away from the indication object 50 by a swipe operation, and then moves the moving object 40 toward the indication object 50 by a swipe operation (flick operation). Specifically, the game progressing unit 113 moves the moving object 40 along the power indication 41 so as to move away from the indication object 50 in accordance with the swipe operation of the player. When receiving a swipe operation (flick operation) in a direction opposite to the previous swipe operation, the game progressing unit 113 moves the moving object 40 toward the indication object 50. At this time, the game progressing unit 113 may move the moving object 40 along the power indication 41 in the direction of the swipe operation (flick operation) toward the opposite side. Thereby, the player can perform an operation as if he/she shot a ball, and the game amusement is enhanced.

Summary

The embodiments of the present invention may also be described as the following supplementary notes.

[Supplementary Note 1]

A game program of the present embodiment causes a processor to execute: a step of displaying an indication object 50 including an indication relating to a shot of a ball 31; a step of receiving an input operation of the user; a step of displaying a moving object 40 that moves in accordance with the input operation; and a step of executing the shot in accordance with the indication determined by a positional relationship between the indication object 50 and the moving object 40 that has moved in accordance with the input operation. Thereby, determination of the power of the shot and determination of the trajectory of the shot can be realized by one operation, and the game amusement is enhanced.

[Supplementary Note 2]

Furthermore, the program of the present embodiment further causes the processor to execute a step of moving the moving object 40 toward the indication object 50 in accordance with the input operation, and in the step of executing the shot, the shot is executed in accordance with the indication (reach indication 51) for the moving object 40 to reach. Thereby, it possible to provide a player with seamless shot operation, and the game amusement is enhanced.

[Supplementary Note 3]

Furthermore, the program of the present embodiment displays, in the step of displaying the indication object 50, the indication object 50 in such a manner as to reciprocate in a direction intersecting a flying direction of the ball 31 shot by the user. Thereby, difficulty in executing an accurate shot can be increased, and the game amusement is enhanced.

[Supplementary Note 4]

A velocity at which the indication object 50 reciprocates in the direction intersecting the flying direction increases as the moving object 40 moves away from the indication object 50. Thereby, the higher the power of the shot set by the player, the more difficult it becomes to realize the shot along the trajectory intended by the player, and the game amusement is enhanced.

[Supplementary Note 5]

Furthermore, in the program of the present embodiment, the indication (51) comprises an indication indicating a direction in which the ball 31 curves. Thereby, the trajectory of the ball can be intentionally curved by the player's operation, and a situation in which the trajectory of the ball is unintentionally curved can be provided to the player, and the game amusement is enhanced.

[Supplementary Note 6]

Furthermore, in the program of the present embodiment, the indication (51) includes a plurality of regions (51) representing different curve directions, and the program further causes the processor to cause a step of specifying an environment around the ball 31; and a step of determining a display area of each of the regions (51) based on the environment. Thereby, it is possible to play a game with mistakes likely to occur in actual golf, and the game amusement is enhanced.

[Supplementary Note 7]

Furthermore, in the program of the present embodiment, the indication (51) comprises an indication relating to accuracy of the shot. Thereby, the game amusement is enhanced.

[Supplementary Note 8]

Furthermore, in the program of the present embodiment, in the step of moving the moving object 40 toward the indication object 50, the moving object 40 is moved in a fixed direction irrespective of a start position of the moving of the moving object 40. This makes it easier for the moving object 40 to reach the indication object 50 that the player aims at, and the game amusement is enhanced.

[Supplementary Note 9]

In the program of the present embodiment, in the step of moving the moving object 40 toward the indication object 50, a moving direction of the moving object 40 is changed in accordance with a start position of the moving of the moving object 40. Thereby, it is possible to provide a player with an image of a shot, and the game amusement is enhanced.

[Supplementary Note 10]

Furthermore, in the program of the present embodiment, a trajectory of the shot ball 31 is changed in accordance with a moving direction of the moving object 40. Thereby, the game amusement is enhanced.

[Supplementary Note 11]

Furthermore, in the program of the present embodiment, the input operation comprises an input operation for moving the second object in a direction away from the first object, and then moving the second object toward the first object. Thereby, the player can perform an operation as if he/she shot a ball, and the game amusement is enhanced.

[Supplementary Note 12]

Furthermore, the program of the present embodiment further causes the processor to execute: a step of specifying an environment at a position of the ball 31; and a step of determining a reciprocating velocity of the indication object 50 based on the environment. Thereby, the worse the shot-making environment, the greater the difficulty in executing an appropriate shot, and the game amusement is enhanced.

REFERENCE SIGNS LIST

1: game system, 10: terminal device, 11: processor, 12: memory, 13: storage, 14: communication IF, 15: input/output IF, 16: touch screen, 17: input unit, 18: display unit, 20: server, 21: processor, 22: memory, 23: storage, 24: communication IF, 25: input/output IF, 110: control unit, 111: operation reception unit, 112: transmission/reception unit, 113: game progressing unit, 114: display control unit, 120: storage unit, 121: game program, 122: game information, 123: user information, 210: control unit, 211: transmission/reception unit, 212: server processing unit, 213: data management unit, 214: synchronization processing unit, 220: storage unit, 221: game program, 222: game information, 223: user information, N: network

The invention claimed is:

1. A non-transitory computer-readable medium storing a game program, the game program causing a processor of a terminal device used by a user to execute:
displaying a first object including a plurality of divided regions in such a manner as to reciprocate in a direction intersecting a moving direction of a ball, each of the regions being displayed in association with an object indicating each of indications relating to movement of the ball;
receiving an input operation of the user;
displaying a second object that moves in accordance with the input operation; and
executing a shot of the ball in accordance with the indication determined by a positional relationship between the first object and the second object that has moved in accordance with the input operation.

2. The non-transitory computer-readable medium according to claim 1, wherein the game program further causes the processor to execute moving the second object toward the first object in accordance with the input operation,
wherein the executing the shot comprises executing the shot in accordance with the indication for the second object to reach.

3. The non-transitory computer-readable medium according to claim 1, wherein a velocity at which the first object reciprocates in the direction intersecting the moving direction increases as the second object moves away from the first object.

4. The non-transitory computer-readable medium according to claim 1, wherein the indication comprises an indication indicating a direction in which the ball curves.

5. The non-transitory computer-readable medium according to claim 4, wherein the indication includes a plurality of regions representing different curve directions, and
the game program further causes the processor to execute:
specifying an environment around the ball; and
determining a display area of each of the regions based on the environment.

6. The non-transitory computer-readable medium according to claim 1, wherein the indication comprises an indication relating to accuracy of the shot.

7. The non-transitory computer-readable medium according to claim 2, wherein the moving the second object toward the first object comprises moving the second object in a fixed direction irrespective of a start position of the moving of the second object.

8. The non-transitory computer-readable medium according to claim 2, wherein the moving the second object toward the first object comprises changing a moving direction of the second object in accordance with a start position of the moving of the second object.

9. The non-transitory computer-readable medium according to claim 8, wherein a trajectory of the shot ball is changed in accordance with the moving direction of the second object.

10. The non-transitory computer-readable medium according to claim 1, wherein the input operation comprises an input operation for moving the second object in a direction away from the first object, and then moving the second object toward the first object.

11. The non-transitory computer-readable medium according to claim 1, wherein the game program further causes the processor to execute:
specifying an environment at a position of the ball; and
determining a reciprocating velocity of the first object based on the environment.

12. A game system, comprising:
a first display unit for displaying a first object including a plurality of divided regions in such a manner as to reciprocate in a direction intersecting a moving direction of a ball, each of the regions being displayed in association with an object indicating each of indications relating to movement of the ball;
a reception unit for receiving an input operation of a user;
a second display unit for displaying a second object that moves in accordance with the input operation; and
a shot execution unit for executing a shot of the ball in accordance with the indication determined by a positional relationship between the first object and the second object that has moved in accordance with the input operation.

* * * * *